US007798496B2

(12) United States Patent
Dietle et al.

(10) Patent No.: US 7,798,496 B2
(45) Date of Patent: Sep. 21, 2010

(54) ROTARY SHAFT SEALING ASSEMBLY

(75) Inventors: Lannie L. Dietle, Houston, TX (US); John E. Schroeder, Richmond, TX (US); Manmohan S. Kalsi, Houston, TX (US); Patricio D. Alvarez, Richmond, TX (US)

(73) Assignee: Kalsi Engineering, Inc., Sugar Land, TX (US)

( * ) Notice: Subject to any disclaimer, the term of this patent is extended or adjusted under 35 U.S.C. 154(b) by 807 days.

(21) Appl. No.: 10/982,821

(22) Filed: Nov. 5, 2004

(65) Prior Publication Data

US 2005/0093246 A1 May 5, 2005

Related U.S. Application Data

(60) Provisional application No. 60/517,505, filed on Nov. 5, 2003.

(51) Int. Cl.
*F16J 15/32* (2006.01)

(52) U.S. Cl. .................. 277/551; 277/559; 277/349

(58) Field of Classification Search ............. 277/559, 277/551, 512, 513, 553, 554, 348, 349, 563
See application file for complete search history.

(56) References Cited

U.S. PATENT DOCUMENTS

| 980 | A | 10/1838 | Thomas |
|---|---|---|---|
| 1,655 | A | 6/1840 | Lewis |
| 2,054 | A | 4/1841 | Coes |

(Continued)

FOREIGN PATENT DOCUMENTS

DE 3425431 C1 12/1985

(Continued)

OTHER PUBLICATIONS

Kalsi, M.S., et al. "A Novel High-Pressure Rotary Shaft Seal Facilitates Innovations in Drilling and Production Equipment", Society of Petroleum Engineers Drilling Conference, Mar. 4-6, 1997, SPE/IADC 37627, Amsterdam, The Netherlands.

(Continued)

*Primary Examiner*—Vishal Patel
*Assistant Examiner*—Gilbert Y Lee
(74) *Attorney, Agent, or Firm*—Douglas W. Rommelmann; Andrews Kurth LLP

(57) ABSTRACT

A rotary shaft sealing assembly in which a first fluid is partitioned from a second fluid in a housing assembly having a rotary shaft located at least partially within. In one embodiment a lip seal is lubricated and flushed with a pressure-generating seal ring preferably having an angled diverting feature. The pressure-generating seal ring and a hydrodynamic seal may be used to define a lubricant-filled region with each of the seals having hydrodynamic inlets facing the lubricant-filled region. Another aspect of the sealing assembly is having a seal to contain pressurized lubricant while withstanding high rotary speeds. Another rotary shaft sealing assembly embodiment includes a lubricant supply providing a lubricant at an elevated pressure to a region between a lip seal and a hydrodynamic seal with a flow control regulating the flow of lubricant past the lip seal. The hydrodynamic seal may include an energizer element having a modulus of elasticity greater than the modulus of elasticity of a sealing lip of the hydrodynamic seal.

35 Claims, 11 Drawing Sheets

U.S. PATENT DOCUMENTS

| | | | |
|---|---|---|---|
| 2,236 | A | 9/1841 | Lee |
| 2,394,800 | A | 2/1946 | Murphy |
| 3,497,225 | A | 2/1970 | Workman |
| 3,744,805 | A | 7/1973 | Heinrich |
| 3,866,924 | A * | 2/1975 | French .................. 277/505 |
| 3,901,517 | A | 8/1975 | Heathcott |
| 3,921,962 | A * | 11/1975 | Feger et al. .................. 366/64 |
| 3,921,987 | A | 11/1975 | Johnston et al. |
| 3,923,315 | A * | 12/1975 | Hadaway ................ 277/559 |
| 3,929,340 | A | 12/1975 | Peisker |
| 3,973,781 | A | 8/1976 | Grorich |
| 3,984,113 | A | 10/1976 | Bentley |
| 4,084,826 | A | 4/1978 | Vossieck et al. |
| 4,094,519 | A | 6/1978 | Heyn et al. |
| 4,118,856 | A | 10/1978 | Bainard et al. |
| 4,165,650 | A * | 8/1979 | Weissler, II ................ 73/700 |
| 4,183,543 | A | 1/1980 | Antonini |
| 4,252,352 | A | 2/1981 | Scannell |
| 4,283,064 | A | 8/1981 | Staab et al. |
| 4,300,777 | A | 11/1981 | Symons |
| 4,328,972 | A | 5/1982 | Albertson et al. |
| 4,336,945 | A | 6/1982 | Christiansen et al. |
| 4,344,631 | A * | 8/1982 | Winn ....................... 277/552 |
| 4,383,691 | A | 5/1983 | Potter |
| 4,387,902 | A | 6/1983 | Conover |
| 4,399,998 | A | 8/1983 | Otto |
| 4,440,405 | A | 4/1984 | Schaus et al. |
| 4,441,722 | A | 4/1984 | Pichler |
| 4,451,050 | A | 5/1984 | Repella |
| 4,482,194 | A * | 11/1984 | Chambers, Sr. ............ 384/480 |
| 4,501,431 | A | 2/1985 | Peisker et al. |
| 4,531,747 | A | 7/1985 | Miura |
| 4,542,573 | A | 9/1985 | Bainard |
| 4,610,319 | A | 9/1986 | Kalsi |
| 4,619,534 | A | 10/1986 | Daly et al. |
| 4,671,519 | A | 6/1987 | Bras et al. |
| 4,689,511 | A * | 8/1987 | Baker et al. .................. 310/88 |
| 4,695,063 | A | 9/1987 | Schmitt et al. |
| 4,705,277 | A | 11/1987 | Repella |
| 4,717,160 | A | 1/1988 | Zitting et al. |
| 4,750,747 | A | 6/1988 | Holzer |
| 4,770,548 | A | 9/1988 | Otto |
| 4,783,086 | A | 11/1988 | Bras et al. |
| 5,002,289 | A | 3/1991 | Yasui et al. |
| 5,044,809 | A * | 9/1991 | Galanty et al. ................ 403/24 |
| 5,137,116 | A * | 8/1992 | Von Bergen et al. ........ 184/6.22 |
| 5,139,275 | A * | 8/1992 | Ehrmann et al. ............ 277/559 |
| 5,190,299 | A | 3/1993 | Johnston |
| 5,195,754 | A | 3/1993 | Dietle |
| 5,195,757 | A | 3/1993 | Dahll |
| 5,219,434 | A * | 6/1993 | Von Bergen et al. ........ 277/351 |
| 5,230,520 | A | 7/1993 | Dietle et al. |
| 5,511,886 | A | 4/1996 | Sink |
| 5,643,026 | A * | 7/1997 | Pietsch et al. ................ 440/112 |
| 5,678,829 | A | 10/1997 | Kalsi et al. |
| 5,692,757 | A | 12/1997 | Straub |
| 5,711,534 | A | 1/1998 | Bengoa et al. |
| 5,738,358 | A | 4/1998 | Kalsi et al. |
| 5,791,658 | A | 8/1998 | Johnston |
| 5,823,541 | A | 10/1998 | Dietle et al. |
| 5,873,576 | A | 2/1999 | Dietle et al. |
| 5,891,830 | A | 4/1999 | Koltermann et al. |
| 5,915,696 | A | 6/1999 | Onuma et al. |
| 5,921,555 | A | 7/1999 | Johnston |
| 6,007,105 | A | 12/1999 | Dietle et al. |
| 6,036,192 | A | 3/2000 | Dietle et al. |
| 6,105,968 | A | 8/2000 | Yeh et al. |
| 6,109,618 | A | 8/2000 | Dietle |
| 6,120,036 | A | 9/2000 | Kalsi et al. |
| 6,139,020 | A | 10/2000 | Friend et al. |
| 6,155,574 | A * | 12/2000 | Borgstrom et al. .......... 277/419 |
| 6,227,547 | B1 | 5/2001 | Dietle et al. |
| 6,315,302 | B1 | 11/2001 | Conroy et al. |
| 6,334,619 | B1 | 1/2002 | Dietle et al. |
| 6,382,634 | B1 | 5/2002 | Dietle et al. |
| 6,428,013 | B1 | 8/2002 | Johnston et al. |
| 6,481,720 | B1 * | 11/2002 | Yoshida et al. .............. 277/400 |
| 6,494,462 | B2 | 12/2002 | Dietle |
| 6,561,520 | B2 | 5/2003 | Kalsi et al. |
| 6,619,664 | B1 | 9/2003 | Metz |
| 6,685,194 | B2 | 2/2004 | Dietle et al. |
| 6,688,603 | B2 | 2/2004 | vom Schemm |
| 6,705,617 | B2 | 3/2004 | Mellet et al. |
| 6,736,404 | B1 * | 5/2004 | Shuster ....................... 277/559 |
| 6,767,016 | B2 | 7/2004 | Gobeli et al. |
| 6,866,270 | B2 * | 3/2005 | Keller et al. ................. 277/349 |
| 2001/0020770 | A1* | 9/2001 | dietle et al. .................. 277/400 |
| 2001/0024016 | A1* | 9/2001 | Gobeli et al. ................ 277/400 |

FOREIGN PATENT DOCUMENTS

| | | |
|---|---|---|
| GB | 499 480 | 1/1939 |
| GB | 759 233 | 10/1956 |

OTHER PUBLICATIONS

Kalsi Engineering, Inc., Drawing No. 300-33 "Redundant Piston Concept," Aug. 14, 2001, 1 pg.

Mission Fluid King, Bulletin No. M203-3 "Installation, Operation and Maintenance Instructions for Mission Magnum I Pumps," 3 pgs., Houston, Texas, undated.

English translation of DE3425431C1.

Fag Kugelfischer Georg Schäfer Kgaa, "Rolling Bearings and their Contribution to the Progress of Technology," 1986, pp. 9-20, Weppert GmbH & Co. KG, Schweinfurt, West Germany.

* cited by examiner

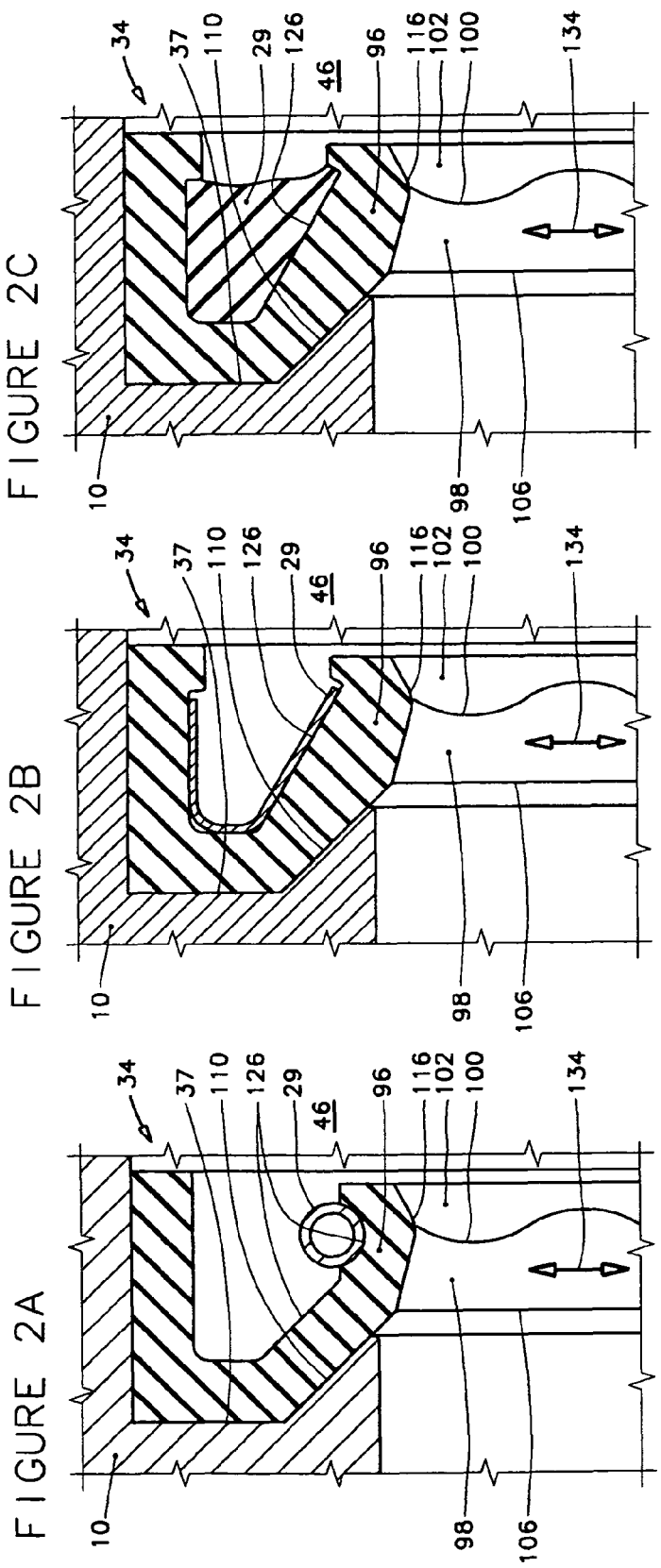

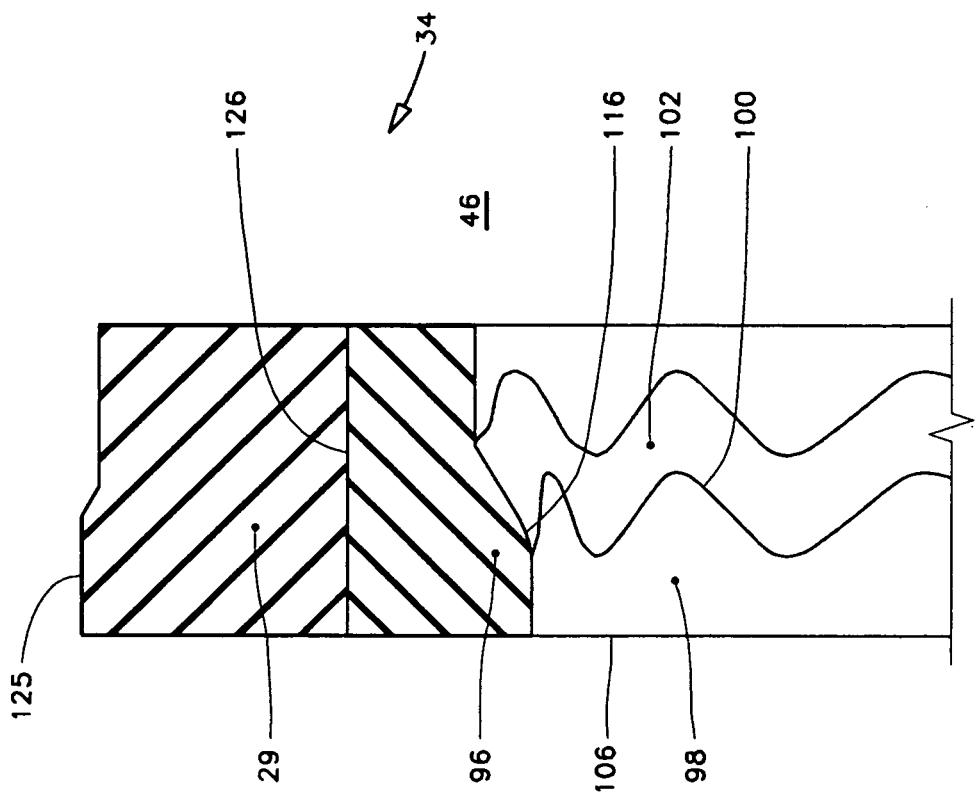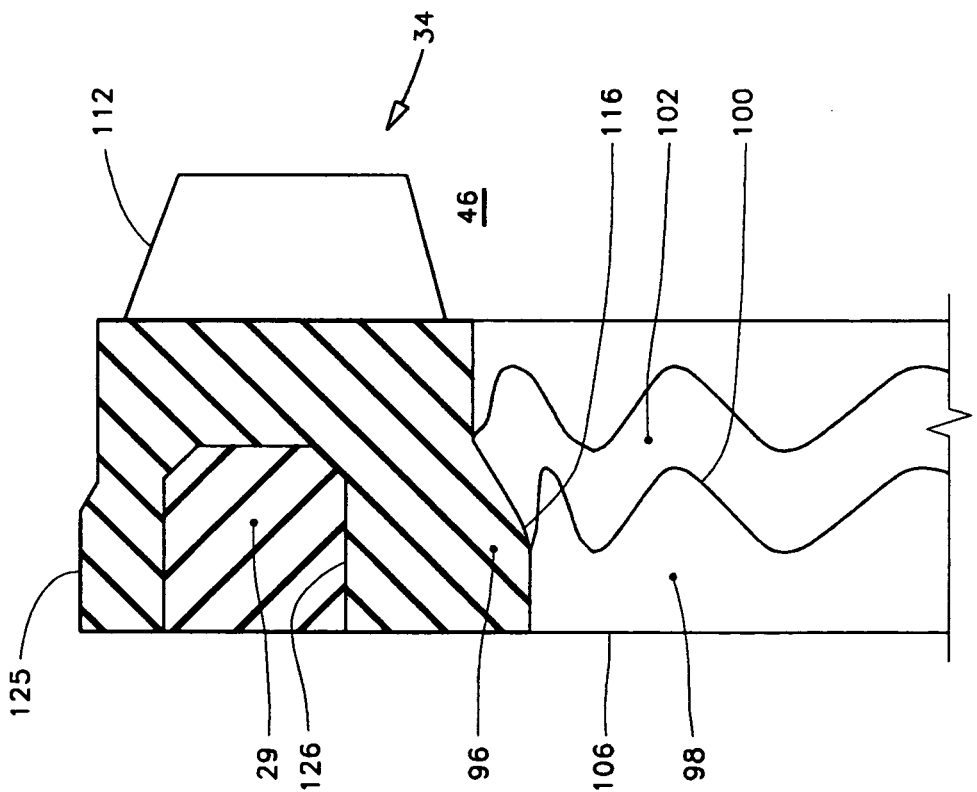

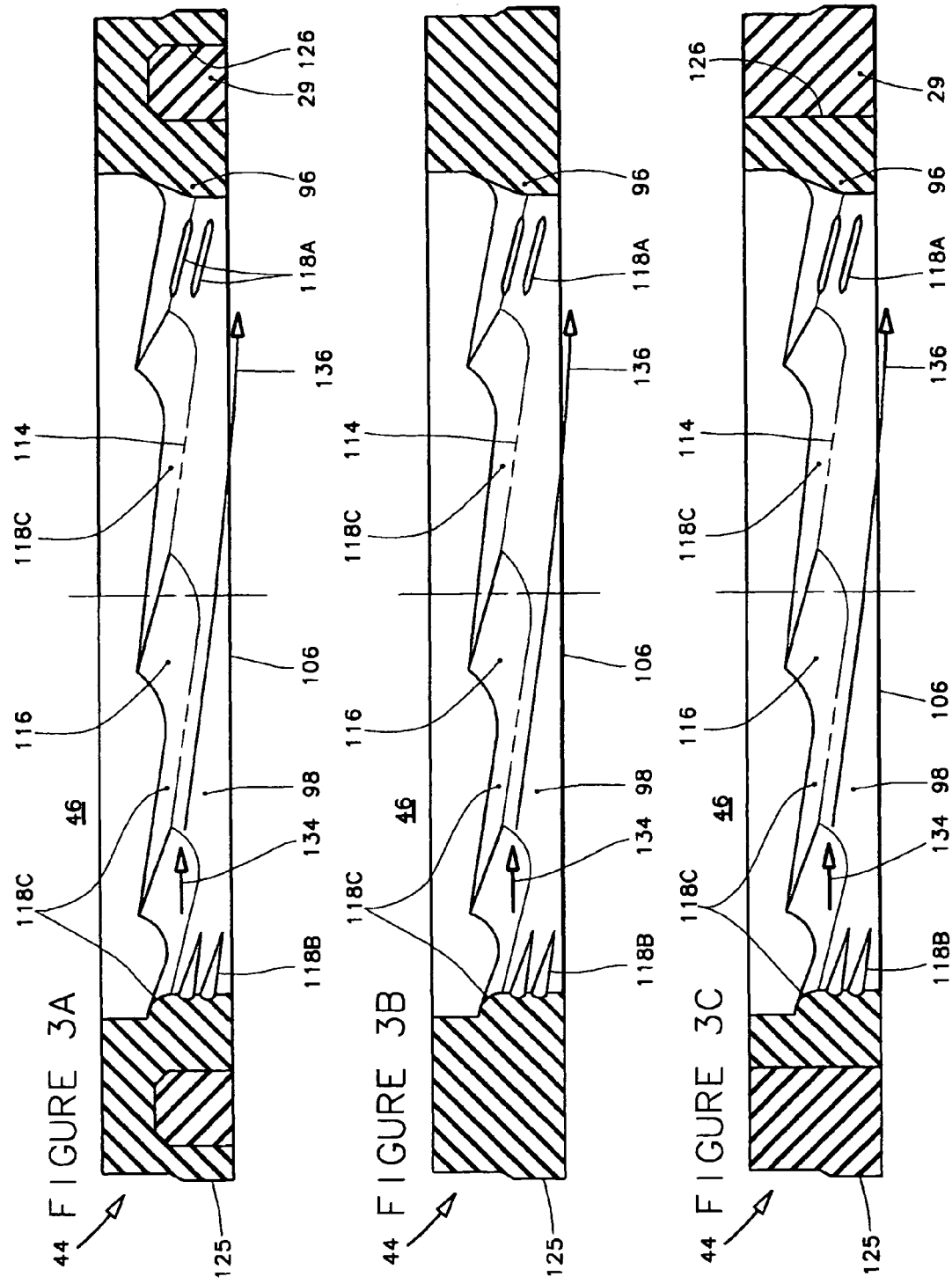

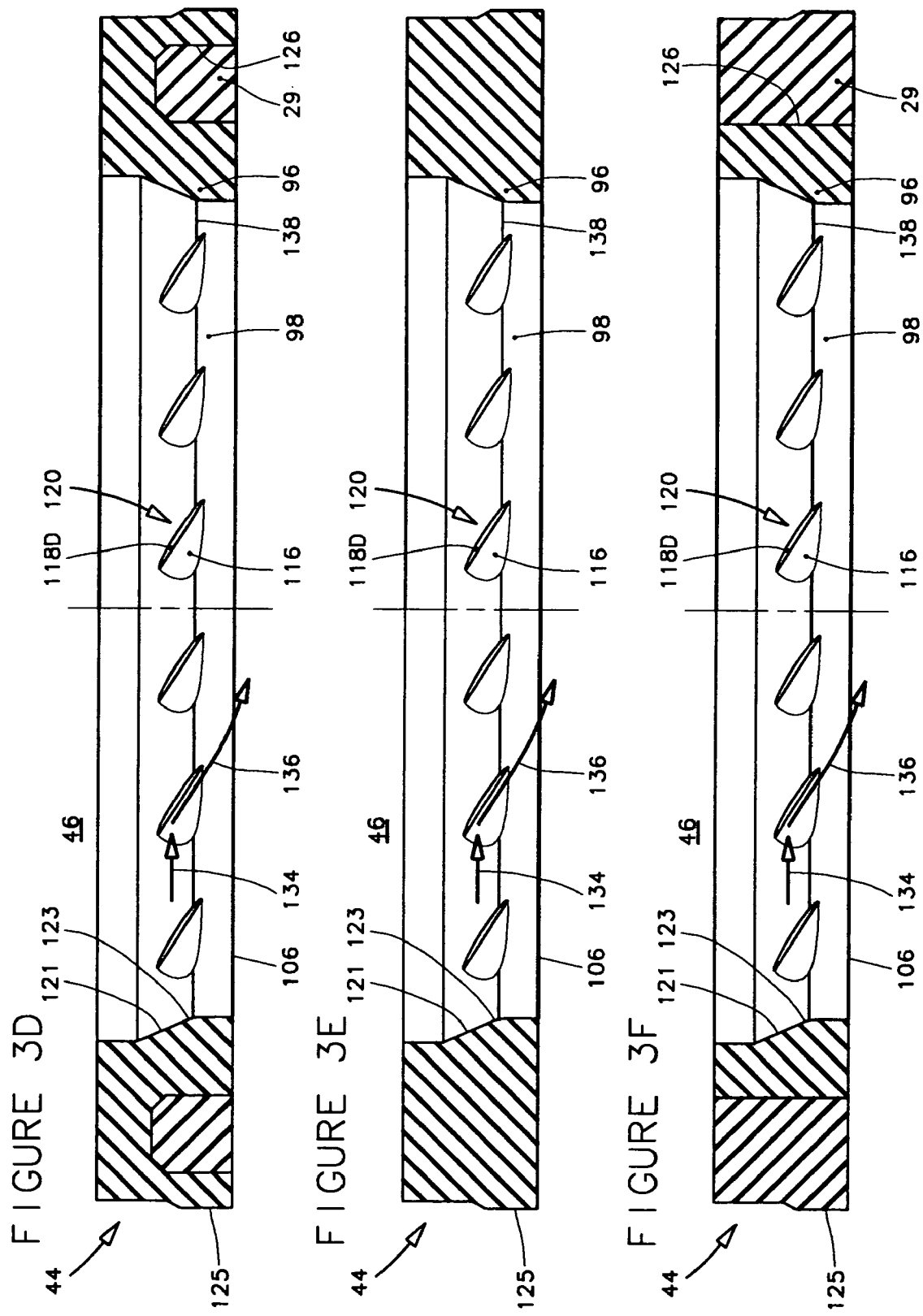

ROTARY SHAFT SEALING ASSEMBLY

CROSS-REFERENCE TO RELATED APPLICATIONS

The benefit of U.S. Provisional Patent Application Ser. No. 60/517,505, filed on Nov. 5, 2003 and entitled "Rotary Seal" is hereby claimed for all purposes and is incorporated by reference herein.

STATEMENT REGARDING FEDERALLY SPONSORED RESEARCH OR DEVELOPMENT

This invention was made with United States Government support under Contract No. DE-AC03-90ER80939 awarded by the Department of Energy. The United States Government therefore has certain rights in this invention.

BACKGROUND OF THE INVENTION

1. Field of Invention

The present invention relates generally to sealing assemblies for rotary shafts located at least partially within a housing.

2. Description of Art

Industry is faced with the problem of transporting various media, such as abrasive-laden fluids/slurries, including, but not limited to, cement, paper pulp, oilfield drilling fluid, bitumen slurry, mica slurry, phosphate slurry, wastewater, crude oil, corn slurry and dredged sand and mud. Various types of equipment are used to handle the abrasive-laden fluids/slurries, such as but not limited to centrifugal pumps, progressing cavity pumps, paper pulp agitators, paper mill tower scrapers, and agitator gear boxes. Rotary seals are often a critical problem in such equipment.

Centrifugal Pump Basics

Centrifugal pumps are one of the most common types of equipment used for handling abrasive-laden fluids and slurries, and their construction is well-known and even somewhat standardized in several instances, and is not illustrated here (For a typical example, see Mission Fluid King Bulletin No. M203-3). They have been manufactured by various companies such as but not limited to Goulds, Gardner Denver, National Oilwell, Griswold, Twentieth Century and Duncan Machine. Centrifugal pumps utilize a shaft-driven impeller that rotates within a casing. Fluid enters the casing near the shaft centerline, and vanes on the rotating impeller rotate the fluid at high velocity, causing it to exit the casing at a discharge outlet. Sealing the rotating shaft where it penetrates the casing is a significant problem when abrasive-laden slurries are encountered.

Oilfield Cement Pump Seal Problems

In oilfield cementing operations, the shaft sealing arrangement on the centrifugal cement pump is typically a set of lip seals. The lip seals facing the cement are lubricated and flushed by a pressurized lubricant supply, but often fail prematurely due to the difficulty of regulating the pressure and lubricant flow rate across the lip seals. The lip seal facing the atmosphere fails quickly because it is ill-suited to retain the pressurized lubricant supply. If seal failure stops a cementing job, the cement contractor typically has to pay for drilling rig downtime until another contractor can show up and finish the job, and the rig rate is typically several thousands of dollars an hour. This means that operators usually try to continue operations, despite the ecological implications of leaked oil and cement associated with seal failure. Other expenses associated with seal failure include the cost of replacement seals, and the cost of the labor and equipment downtime associated with seal replacement.

Paper Pulp Stock Pump Seal Problems

Mechanical face seals are often used to seal centrifugal pumps that are used in paper mills to transport paper pulp, which is an abrasive slurry. The vast majority of pumps are the 3 to 4.5" shaft size at 1200 to 1800 RPM, and typical pump flow rates are 300-1000 GPM.

Flush water is used to cool the mechanical face seals, and to dilute the abrasive concentration at the seal location; the flush water goes into the paper pulp mixture. A flush water flow rate of 4 to 5 gallons per minute is typically used, which means that a single pump requires 2.1 to 2.6 million gallons of water per year of operation. Since a typical paper mill uses hundreds of centrifugal pumps, the cost of purchasing the flush water, extracting the excess from the paper pulp, and cleaning it for disposal are enormous. When seal failure occurs, it is sometimes catastrophic, due to face breakage which can dump hundreds if not thousands of gallons of paper pulp stock onto the floor before the problem is identified. If seal loss results in shutting the production line down, the loss can be in the range of $50,000 an hour while the seals are being replaced.

The mechanical face seal is typically mounted to the stuffing box of the pump, but the stuffing box is often misaligned with the shaft, particularly on larger pumps, due to wear and corrosion of the piloting surfaces. Misalignment of up to $\frac{1}{16}$" has been observed in service.

The plants typically try to maintain a flush water pressure that is about 20 PSI higher than the stuffing box pressure under normal operating conditions (e.g. non-deadheading conditions) so that the flush water goes from the water supply into the pulp stock, rather than vice-a-versa.

Deadheading (e.g. closing the pump discharge line) occurs if too much stock is being pumped. Deadheading a pump can cause enough stuffing box pressure to cause reverse flow of the flush water, causing the pulp stock (e.g. process fluid) to enter the water supply system and contaminate or plug the water supply to other pumps, resulting in propagation of seal failures across the plant. The plants should, but don't always, use check valves to prevent the deadhead-related reverse flow. Deadheading also causes pump cavitation and shaft vibration that can shatter mechanical face seals, which opens up a large leakage path to the atmosphere.

Prior Art Problems Pairing Kalsi Seals with Lip Seals

The solid cross-section hydrodynamic rotary seals based on U.S. Pat. Nos. 4,610,319, 5,230,520, 6,120,036, 6,315,302 and 6,382,634, commonly assigned herewith, which are commonly known by the registered trademark "Kalsi Seals", have not had commercial success in pumps because they generate too much heat at the high rotary speeds typical to pumps. They are utilized successfully in relatively low speed oilfield down-hole drilling equipment such as mud motor sealed bearing assemblies and advanced rotary steerable systems. One reason such seals are suitable for such down-hole equipment is because the seal leakage rate associated with the seal hydrodynamic pumping action is very low, and compatible with the relatively small lubricant reservoirs that can be accommodated in such equipment.

When used in oilfield down-hole drilling equipment, the above-noted hydrodynamic seals are sometimes used with outboard lip seals that are intended to help to protect the hydrodynamic seals. This type of arrangement can be very problematic, because the equipment operates in deep wellbores that are filled with drilling fluid, and the weight of the drilling fluid causes the ambient pressure surrounding the equipment to be very high. If a lip seal is simply positioned outboard of the hydrodynamic seal without some means to balance the pressure to the ambient environment, atmospheric pressure is trapped between the two seals at the time of assembly. Therefore when the assembly is exposed to the high ambient pressure down-hole, the lip seal simply collapses from the high differential pressure, and fails.

One way to gain a slight amount of down-hole utility from the lip seal is to defeat its sealing function in some manner, such as by cutting the lip, so that the lip cannot attain a true sealed relationship with the shaft. This lets the pressure between the seals equalize to the ambient pressure by allowing any unfilled space between the seals to fill with drilling fluid. If the region between the seals is partially filled with grease at the time of assembly, this arrangement provides a dilution zone between the seals so that the hydrodynamic seal is, at least temporarily, exposed to a reduced concentration of abrasives. Such a seal arrangement is typically called a barrier seal arrangement.

Another way to gain utility from the lip seal is to provide a mechanism that pressure balances the region between the two seals to the ambient environment pressure. One such pressure-balancing mechanism is shown on Kalsi Engineering Drawing 300-33. An O-ring that is in axial compression in a deep tapered radial groove, moves radially inward to compensate the pressure between the two rotary seals, and moves radially outward to burp-off the leakage of the inner hydrodynamic seal. Although on drawing 300-33 the pressure-balancing mechanism is shown with two hydrodynamic seals, it has also been used to pressure-balance the region between a hydrodynamic seal and a lip seal.

Prior Art Hydrodynamic Diverter Seals

The commonly assigned U.S. Pat. Nos. 6,109,618 and 6,494,462 of Dietle, which arise from the same original application and which are incorporated herein by reference for all purposes, teach the use of angled diverting features for causing copious lubricant flow within a dynamic sealing interface for the recited purpose of lubricating and flushing the dynamic sealing interface. In U.S. Pat. No. 6,109,618 these angled diverting features are called "restrictive diverters", and in U.S. Pat. No. 6,494,462 they are called "pressure manipulation features". Hydrodynamic diverter seals that incorporate such angled diverting features have been developed to act as miniature pumps that can generate substantial flow and pressure. The prior art does not suggest the use of such seals to pressurize other rotary seals, or to lubricate other rotary seals, or to provide a contaminant flushing action across the dynamic sealing interface of other rotary seals.

It is desirable to be able to overcome the shortcomings described above. More particularly, it is desirable to have a rotary shaft sealing assembly in which one or more lip seals are pressurized, lubricated and flushed. It is also desirable to have a rotary shaft sealing assembly in which a seal may be used to prevent reverse flow during deadheading conditions. It is also desirable to have a rotary shaft sealing assembly having a seal to contain pressurized lubricant while withstanding a high rotary speed. It is also desirable to have a rotary shaft sealing assembly in which a seal causes a stuffing box to align on the shaft during installation. It is also desirable to have a rotary shaft sealing assembly having a protective weir and rotating cover assembly to protect the exposed air side of the seal.

BRIEF SUMMARY OF THE INVENTION

The present invention includes a rotary shaft sealing assembly which overcomes the above-described shortcomings. The present invention includes several desirable features which may be used in conjunction with the other features or used separately or in conjunction with one or more of the other features. In one embodiment of the present invention, the rotary shaft sealing assembly uses the flow and pressure-generating capability of a hydrodynamic diverter seal to pressurize, lubricate and flush one or more lip seals. Another aspect of the present invention uses the sealing ability of a hydrodynamic diverter seal to prevent reverse flow during deadheading conditions. In another embodiment of the present invention, a low contact force hydrodynamic seal is used to contain the pressurized lubricant and withstand the high rotary speed. In another embodiment of the present invention, the rotary shaft sealing assembly includes a seal causing a stuffing box to align on the shaft during installation. In still another embodiment of the present invention, the rotary shaft sealing assembly has a protective weir and rotating cover assembly to protect the exposed air side of the seal.

In one embodiment of the present invention, the rotary shaft sealing assembly for partitioning a first fluid from a second fluid includes a housing assembly, a rotary shaft located at least partially within the housing assembly and having at least one relative rotation direction, a weir formed in the housing assembly and circumscribing a passageway through which the rotary shaft extends, and a dust cover mounted on the rotary shaft with the dust cover including a cover portion extending over at least a portion of the weir. Additionally, a cantilever lip seal is in sealing engagement with the housing assembly and the rotary shaft. The cantilever lip seal has a first energizer element and a cantilevered lip facing the first fluid. A pressure-generating seal ring is in sealing engagement with the housing assembly and the rotary shaft and has a first hydrodynamic lip defining a first dynamic surface. The pressure-generating seal ring is adapted to provide flushing and lubricating of the cantilevered lip of the cantilever lip seal in response to relative rotation of the rotary shaft. The pressure-generating seal ring and the cantilever lip seal define at least a portion of a sealed region having a pressure. A wavy-edged hydrodynamic seal is in sealing engagement with the housing assembly and the rotary shaft. The wavy-edged hydrodynamic seal includes a second hydrodynamic lip having cantilevered construction and a predetermined modulus of elasticity, a second dynamic surface, and a wavy edge that defines at least one wave having a leading wave edge and a trailing wave edge. The wavy-edged hydrodynamic seal and the pressure-generating seal ring define at least a portion of a lubricant-filled region having a pressure, and circulation through the lubricant-filled region cools the housing assembly. A lubricant supply provides a pressurized lubricant to the lubricant-filled region. At least one bearing is within the housing assembly and in the lubricant-filled region. An outboard barrier seal is in sealing engagement with the rotary shaft and the housing assembly. The wavy-edged hydrodynamic seal and the outboard barrier seal define at least part of an outboard sealed region. An exit port is in the housing assembly for draining the outboard sealed region.

In a second embodiment, the rotary shaft sealing assembly for partitioning a first fluid from a second fluid includes a housing assembly and a rotary shaft located at least partially within the housing assembly and having at least one relative rotation direction. A cantilever lip seal is in sealing engagement with the rotary shaft and the housing assembly. The cantilever lip seal has a cantilevered lip for facing the first fluid. A pressure-generating seal ring is in sealing engagement with the rotary shaft and the housing assembly. The pressure-generating seal ring has a hydrodynamic lip defining a dynamic surface and at least one hydrodynamic inlet and at least one angled diverting feature adapted to provide flushing and lubricating of the cantilevered lip of the cantilever lip seal with a lubricant in response to relative rotation of the rotary shaft.

In another embodiment of the present invention, the rotary shaft sealing assembly for partitioning a first fluid from a second fluid includes a housing assembly and a rotary shaft located at least partially within the housing assembly and having at least one relative rotation direction. A cantilever lip seal in sealing engagement with the rotary shaft and the housing assembly. The cantilever lip seal having a cantilevered lip for facing the first fluid. A wavy-edged hydrodynamic seal in sealing engagement with the rotary shaft and the housing assembly. The hydrodynamic seal has at least one hydrodynamic inlet of skewed configuration being defined by a hydrodynamic lip having a predetermined modulus of elasticity. The hydrodynamic seal includes an energizer element having a modulus of elasticity different than the predetermined modulus of elasticity of the hydrodynamic lip. A lubricant supply provides a lubricant at an elevated pressure to a region within the housing assembly between the cantilever lip seal and the hydrodynamic seal. A flow control regulates the flow of the lubricant past the cantilever lip seal.

In another embodiment of the present invention, a wavy-edged hydrodynamic seal comprises a hydrodynamic sealing lip of cantilevered construction having a predetermined modulus of elasticity and defining a dynamic surface. The hydrodynamic sealing lip defines a hydrodynamic inlet for facing a lubricant-filled region and defines a circular edge. The hydrodynamic inlet is skewed in relation to the circular edge. An energizer interface is defined at least in part by the hydrodynamic sealing lip and generally faces the lubricant-filled region. An energizer element engages the energizer interface and has a modulus of elasticity that is different than the predetermined modulus of elasticity of the hydrodynamic sealing lip.

In another embodiment of the present invention, a seal assembly comprises a housing having a first supporting wall and a second supporting wall having a recess. A wavy-edged hydrodynamic seal is located intermediate the first and second supporting walls. The wavy-edged hydrodynamic seal includes a circular edge generally facing the first supporting wall and a hydrodynamic sealing lip defining at least one dynamic surface and defining a hydrodynamic inlet generally facing the second supporting wall. An anti-rotation projection engages the recess of the second supporting wall.

In still another embodiment, a mechanical arrangement for preventing debris from entering a clearance between a housing and a rotary shaft, the mechanical arrangement comprises a weir formed in the housing and circumscribing a passageway through which the rotary shaft extends, and a dust cover mounted on the rotary shaft. The dust cover includes a cover portion extending over at least a portion of the weir.

It is intended that the rotary seals of the present invention may incorporate one or more seal materials or components without departing from the spirit or scope of the invention, and may be composed of any suitable sealing material, including elastomeric or rubber-like materials and various polymeric materials. The rotary seals may be of monolithic integral, one piece construction or may also incorporate different materials bonded or inter-fitted together to form a composite structure.

In a preferred embodiment of the invention, it is intended that at least one of the rotary seals be a pressure-generating seal ring that incorporates at least one angled diverting feature exposed to a hydrodynamically wedged film of lubricant within the dynamic sealing interface between the seal and the relatively rotating rotary shaft for diverting a portion of the hydrodynamically wedged film of lubricant across the dynamic sealing interface, and causing a high leakage of the lubricant from the dynamic sealing interface. The surface of the rotary shaft has at least one direction of relative rotation. The angled diverting feature is preferably of discontinuous geometry, and is oriented in skewed relation to the direction of shaft rotation, and serves as a pressure manipulation feature that establishes a zone of interfacial contact pressure that is skewed relative to the direction of relative rotation and serves as an angulated restriction that provides a damming effect to divert the lubricant axially. The diverting activity of the angled diverting feature enhances lubrication of the dynamic sealing interface, flushes contaminants out of the dynamic sealing interface, reduces seal torque and self-generated heat, reduces heat-related seal degradation such as compression set, and permits high rotary speeds without rotary seal overheating. In the preferred embodiment, the leakage from the pressure-generating seal ring is used to pressurize, lubricate and flush one or more lip seals.

The angled diverting feature can take many forms that are skewed in relation to the relative rotation direction of the rotary shaft, such as a projecting ridge that may be located at the trailing edge of a hydrodynamic wave, or one or more (and preferably a plurality of) projecting ridges or depressions preferably located at least partially on the dynamic sealing surface, an external corner near the trailing edge of a hydrodynamic wave, or simply by use of a converging shape at the trailing edge of a hydrodynamic wave that is more abrupt than the gently converging hydrodynamic inlet shape at the leading edge of the wave. When more than one angled diverting feature is employed, they are preferably disposed in spaced relation with respect to one another to provide lubricant migration paths across the width of the dynamic sealing surface, and they collectively establish at least one elevated contact pressure zone with the relatively rotatable surface at least partially within said dynamic sealing interface and oriented in skewed relation to the direction of relative rotation, and the elevated contact pressure zone interacts with the lubricant within the dynamic sealing interface for causing controlled movement of the lubricant across the dynamic sealing interface.

Another feature of the present invention is the use of redundant rotary seals in such a way that failure of a redundant seal can provide a signal to an operator so that the operator can plan for a controlled shutdown, and complete seal failure can provide a signal to shut down a motor controller to terminate rotation and prevent process fluid leakage.

So that the manner in which the above recited features, advantages and objects of the present invention are attained and can be understood in detail, a more particular description of the invention, briefly summarized above, may be had by reference to the preferred embodiment thereof which is illustrated in the appended drawings, which drawings are incorporated as a part hereof.

It is to be noted however, that the appended drawings illustrate only typical embodiment of this invention and are therefore not to be considered limiting of its scope, for the invention may admit to other equally effective embodiments.

BRIEF DESCRIPTION OF THE SEVERAL VIEWS OF THE DRAWINGS

So that the manner in which the above recited features and advantages of the embodiments of the invention, as well as others which will become apparent, are attained and can be understood in detail, a more particular description of the invention, briefly summarized above, may be had by reference to the embodiments thereof documented in the drawings and accompanying text which follow. It is to be noted, however, that the drawings illustrate only typical embodiments of this invention, and are not to be considered limiting of its scope, for the invention admits to many other equally effective embodiments which vary only in specific detail. In the drawings:

FIGS. 2A, 2B and 2C are fragmentary elevation views, in cross-section, of three embodiments of the wavy-edged hydrodynamic seal and showing the wavy edge, each seal embodiment including a different type of energizer element;

FIGS. 2D and 2E are fragmentary elevation views, in cross-section, of two additional embodiments of the wavy-edged hydrodynamic seal and showing the wavy edge, each seal embodiment including a different type of energizer element and having a generally rectangular, solid cross-section;

FIGS. 3A, 3B and 3C are elevation views, in cross-section, of three embodiments of the pressure-generating seal ring and showing the dynamic surface and angled diverting features, the seal embodiment of FIG. 3B not having an energizer element whereas the seal embodiments of FIGS. 3A and 3C including different types of energizer elements;

FIGS. 3D, 3E and 3F are elevation views, in cross-section, of three additional embodiments of the pressure-generating seal ring and showing a pressure manipulation feature with another type of angled diverting feature, the seal embodiment of FIG. 3E not having an energizer element whereas the seal embodiments of FIGS. 3D and 3F including different types of energizer elements;

DETAILED DESCRIPTION OF THE INVENTION

Figure 1:
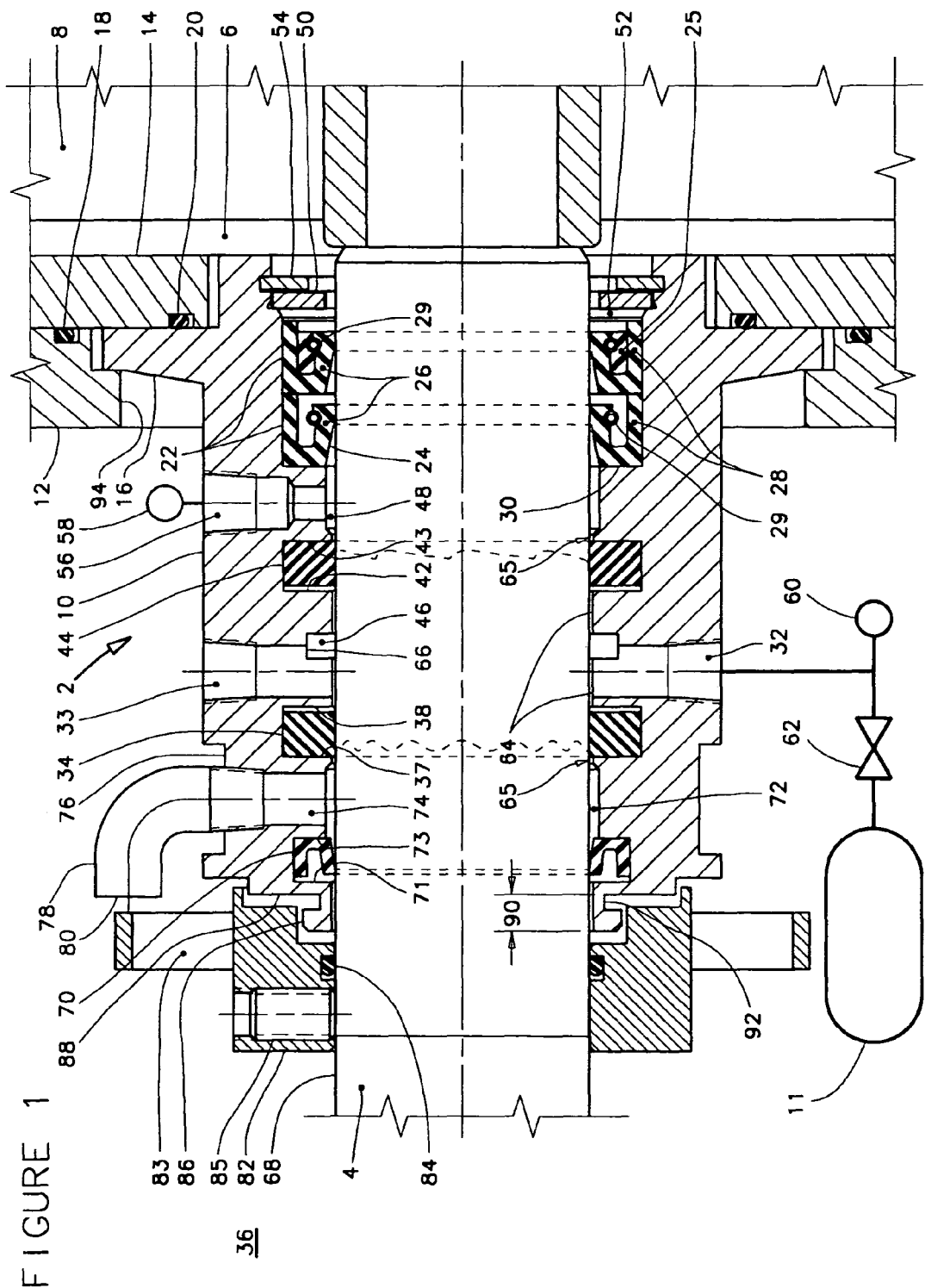
FIG. 1 is an elevation view, in cross-section, of a rotary seal assembly according to one embodiment of the present invention, the embodiment including one or more cantilever lip seals, a pressure-generating seal ring, a wavy-edged hydrodynamic seal and a barrier seal in sealing engagement with a rotary shaft and a housing.

Description of FIG. 1

One embodiment of the invention, represented in fragmentary longitudinal cross-section in FIG. 1 herein, is a sealing arrangement directed at partitioning a first fluid 6 from a second fluid 36 in applications where a rotary shaft 4 penetrates a housing or vessel containing a fluid therein, such as the casing of a pump. For purposes of this specification, the term fluid has its broadest meaning, encompassing both liquids and gases.

Features throughout this specification that are represented by like numbers have the same function. For orientation purposes, it should be understood that in the cross-sectional figures herein, the respective cutting planes passes through the longitudinal axis of the rotary seals.

Referring now to the drawings, and first to FIG. 1, the rotary shaft sealing assembly 2 of the present invention is shown generally at 2 as it may be employed in a centrifugal pump of typical Gardner Denver/Twentieth Century brand construction; e.g. a rotary shaft 4 is supported in the customary fashion by frame-mounted bearings (not shown) and support an impeller 8. The housing 10 is clamped to the pump frame 12 by a clamping element 14. In some pumps clamping element 14 is part of the wear plate, while in others, it is part of the casing. The region filled with first fluid 6 is called the "pump casing", and first fluid 6 is often referred to as the "process fluid".

The impeller 8 rotates within the first fluid 6, causing first fluid 6 to rotate at high velocity and exit the casing at a discharge outlet (not shown). In certain instances, portions of the pump casing near housing 10 may experience a vacuum or semi-vacuum condition.

It can be appreciated that the present invention is applicable to pumps that differ in construction details from Gardner Denver/Twentieth Century pumps, for example, in Mission-brand centrifugal pumps the stuffing box and wear plate are integrated into one unit called a "cover, stuffing box" that is retained by clamping action of the pump casing. Although the seal assembly of the present invention is shown assembled on a centrifugal pump, such is not intended to limit the scope of the invention for it is equally suitable for use in many other types of rotary shaft equipment that partition a first fluid 6 from a second fluid 36, such as equipment where a rotary shaft penetrates a vessel, reservoir, or other structure that is in contact with or contains a fluid so that a seal mechanism is required to contain the fluid.

Rotary shaft 4 may comprise a single component, or may be comprised of several components assembled together, such as one or more sleeve components being assembled together with a generally rod-like or tube-like component (see FIG. 5), or several components threaded together to form a generally rod-like or tube-like component, it being understood that the shaft may also be hollow to conduct a fluid.

The housing 10 has a shaft passage therein for receiving rotary shaft 4, and in the preferred embodiment utilizes a flange 16 for attachment to the pump frame 12. In the case of Gardner Denver/Twentieth Century pumps, the flange 16 is clamped to the pump frame 12 by a clamping element 14 that is the wear plate which is connected to the pump frame 12 with bolts (not shown), and which has a sealed relationship with the pump frame 12.

Although the housing 10 is shown being attached by a specific retaining means, the retaining means can take any suitable form, such as a pattern of bolts, a threaded connection, a snap-ring-type retaining ring, etc., without departing from the spirit or scope of the invention. Alternately, housing 10 and a structure of the host machinery may be constructed together as an integral unit.

The sealed relationship between the pump frame 12 and the clamping element 14 is illustrated schematically by clamping element seal 18. A sealed relationship between housing 10 and the pump structure is illustrated schematically by static seal 20. Without departing from the spirit or scope of the invention, clamping element seal 18 and static seal 20 can be any suitable type of sealing arrangement, such as gasket material (see FIG. 5), O-rings, square rings, etc. or by rubber-coating a portion of the clamping element 14 for contact with the housing 10 (see FIG. 4).

In the embodiment shown in FIG. 1, the housing 10 locates one or more conventional cantilever lip seals 22 of generally circular configuration for facing the first fluid 6. Cantilever lip seals 22 are redundant sacrificial seals, which upon failure do not compromise sealing integrity. An example of a suitable cantilever lip seal for a 2" rotary shaft 4 would be a JM Clipper brand PN 0200 11551 H1L5 LUP seal. The primary characteristic for selection of the cantilever lip seal 22 is pressure-responsiveness of the lip; i.e., the lip must be of a type where lubricant pressure acting on the inside surface 24 of the cantilever lip 26 causes the cantilever lip 26 to lift away from rotary shaft 4 and allow lubricant to pass between the cantilever lip 26 and the rotary shaft 4. Another characteristic to be considered when selecting the cantilever lip seal 22 is the ability of the cantilever lip 26 to follow lateral deflection of the rotary shaft 4. Another desirable feature to be considered in the selection of the cantilever lip seal 22 is a static sealing lip 28 that establishes an interference fit with the housing 10, and establishes friction between the static sealing lip 28 and the housing 10. Ideally, the friction between the static sealing lip 28 and the housing 10 is such that the one or more cantilever lip seals 22, do not slide axially within the housing 10 when moderate fluid pressure is applied to the lubricant-end 30 of the cantilever lip seal 22. The JM Clipper brand PN 0200 11551 H1L5 LUP seal is ideal in this regard, as the static sealing lip 28 is of a somewhat rigid composite construction, and its interference fit with the housing 10 generates considerable seal-retaining friction.

In a preferred embodiment of the present invention shown in FIG. 1, an energizer element 29 is provided to load cantilever lip 26 against rotary shaft 4. The energizer element 29 can take any of a number of suitable forms known in the art, including soft elastomer inserts and various forms of springs such as garter springs, canted coil springs, and cantilever springs, without departing from the scope or spirit of the invention. Referring to FIGS. 2A-2D and 3D, an energizer recess 126 can also be of any suitable form.

The cavity region between the cantilever lip 26 and the static sealing lip 28 of one or more of the cantilever lip seals 22 may be filled with a soft resilient filler material 25 such as a low durometer castable silicone, if desired, to prevent the region from clogging with process fluid. For example, when the process fluid is cement, the soft resilient material can prevent the cement from settling and setting up in the region between the cantilever lip 26 and the static sealing lip 28 (which would prevent flexure of the cantilever lip 26), and can prevent the dislodgement of an energizer element 29. Even if the cantilever lip seals are only partially filled with the soft resilient filler material 25, the filler material can serve to retain energizer element 29 by effectively bonding the energizer element 29 to the cantilever lip 26. A criterion for design of the one or more cantilever lip seals 22 that incorporate the soft resilient filler material 25 is a construction wherein lubricant pressure acting on the inside surface 24 of cantilever lip 26 causes cantilever lip 26 to lift away from rotary shaft 4 and allow lubricant to pass between cantilever lip 26 and rotary shaft 4; i.e., allows the pressure to cause the lubricant to "burp-off" past the cantilever lip 26. This is most easily accomplished by inserting the filler material 25 when the cantilever lip 26 is in a compressed condition, rather than a relaxed condition, so that the filler material 25 adds little resistance to the "burp-off" pressure of the cantilever lip 26.

Figure 5:
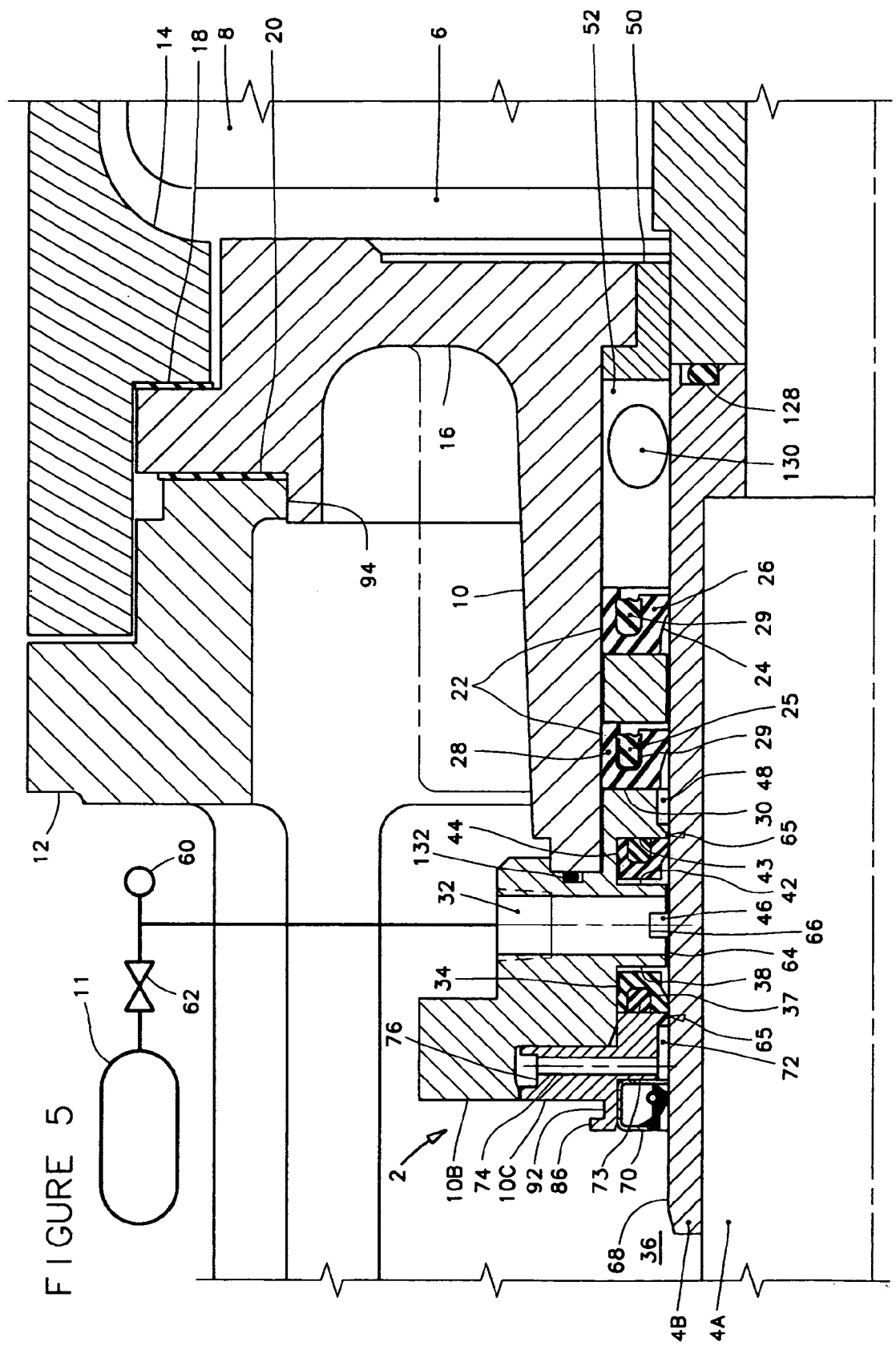
FIG. 5 is a fragmentary elevation view, in cross-section, of a rotary seal assembly according to another embodiment of the present invention, the embodiment including one or more cantilever lip seals, a pressure-generating seal ring, and a wavy-edged hydrodynamic seal in sealing engagement with a rotary shaft and a housing.
Figure 7:
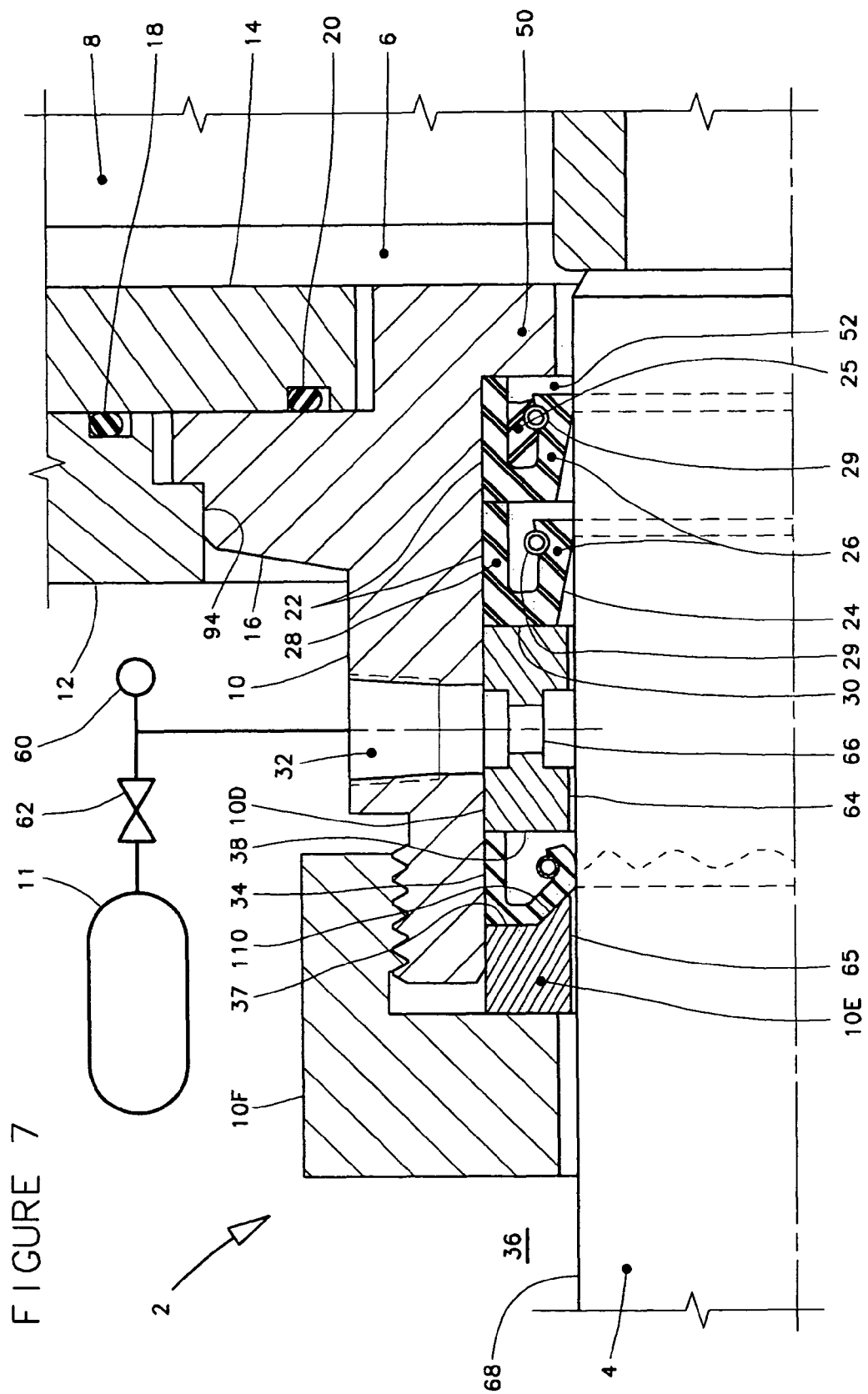
FIG. 7 is a fragmentary elevation view, in cross-section, of a rotary seal assembly according to another embodiment of the present invention, the embodiment including one or more cantilever lip seals and a wavy-edged hydrodynamic seal in sealing engagement with a rotary shaft and a housing.
Figure 8:
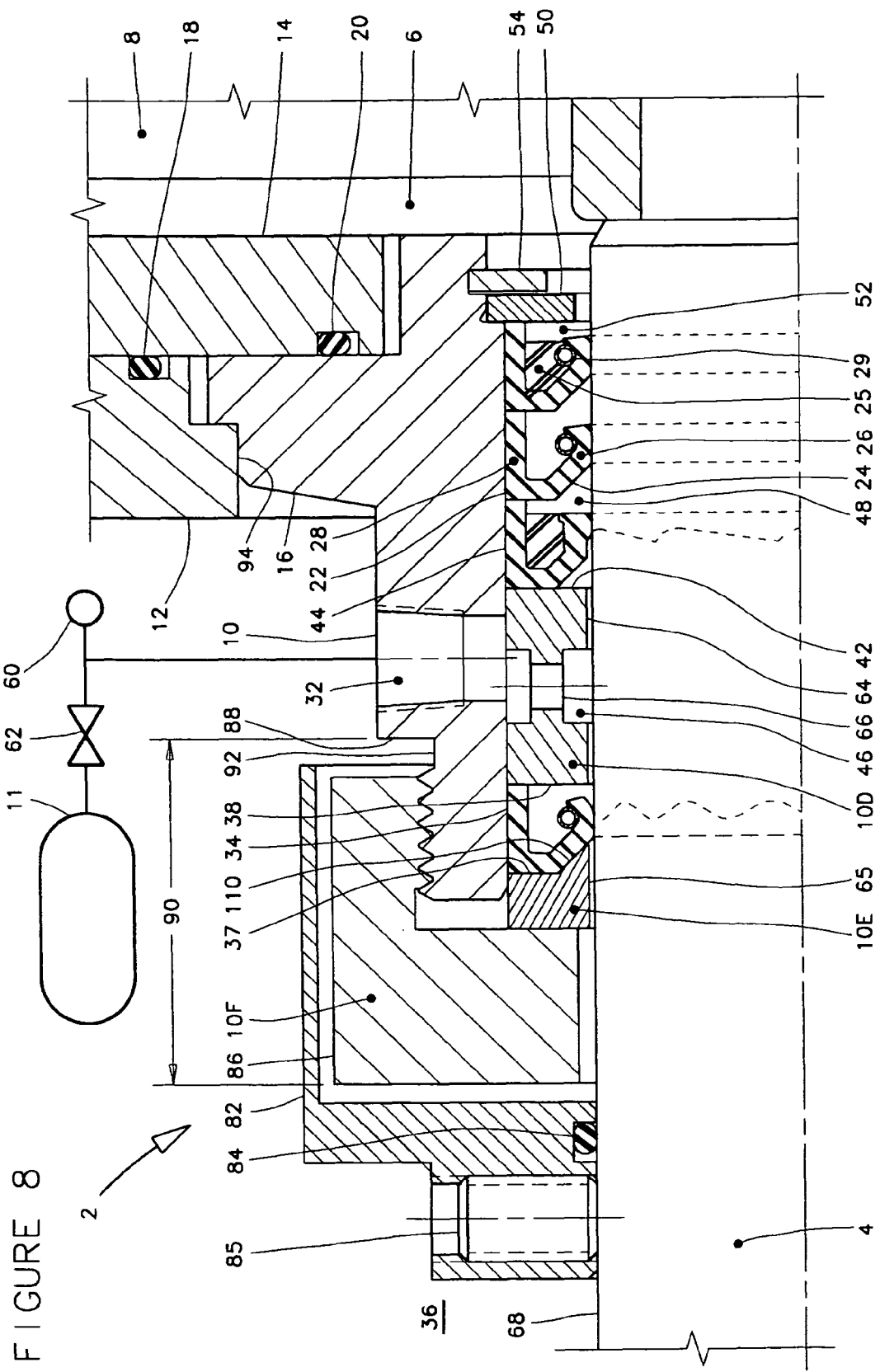
FIG. 8 is a fragmentary elevation view, in cross-section, of a rotary seal assembly according to another embodiment of the present invention, the embodiment including one or more cantilever lip seals, a pressure-generating seal ring, and a wavy-edged hydrodynamic seal in sealing engagement with a rotary shaft and a housing.

The housing 10 can take the form of a single component as shown in FIG. 1, or a plurality of two or more individual components (see FIGS. 5, 7 and 8). For example, the component that holds the cantilever lip seal 22 could be separate from the component or components that hold the remainder of the seals (see FIG. 5). As an example, the conventional stuffing box that comes with the pump could hold the one or more cantilever lip seals 22, and a separate component could hold a wavy-edged hydrodynamic seal 34 and/or a pressure-generating seal ring 44 (see FIG. 5).

Referring to FIG. 1, a lubricant is communicated into the housing 10 from a lubricant supply 11 (shown schematically) through at least one lubricant port 32 for lubrication of the several rotary seals located by housing 10. Preferably, lubricant supply 11 is pressurized, so that the pressure promotes lubricant flow into housing 10 as the lubricant within the housing 10 is depleted. The lubricant can be any suitable fluid, such as but not limited to water, and natural or synthetic oils including but not limited to motor oils, gear oils, canola oil, etc. Although not an absolute requirement, the pressure of lubricant supply 11 is preferably higher than the pressure within first fluid 6 in embodiments using the pressure-generating seal ring 44 (see FIG. 1). In the embodiments that eliminate pressure-generating seal ring 44 (see FIGS. 6 and 7), the pressure of lubricant supply 11 must be higher than the pressure within first fluid 6.

In the preferred embodiment shown in FIG. 1, there is also a vent port 33 located substantially opposite lubricant port 32. In applications where rotary shaft 4 is oriented horizontally, vent port 33 is preferably oriented on the top side of rotary shaft sealing assembly 2, and lubricant port 32 is preferably oriented on the bottom side of rotary shaft sealing assembly 2. This arrangement provides for simplified initial lubricant filling of housing 10, because vent port 33 allows air to escape as lubricant enters through lubricant port 32.

In paper mills, the water lines are worked on frequently, which introduces pipe scale into the water lines. By orienting lubricant port 32 on the bottom side of rotary shaft sealing assembly 2, a natural gravity trap is created so that any contaminants within the lubricant tend to settle out, rather than enter rotary shaft sealing assembly 2. The natural gravity trap created by rotary shaft sealing assembly 2 can be augmented if desired, by using a conventional "seal pot" which is a well-known gravity trap that is used in the mechanical face seal industry.

If required for cooling, the lubricant can be circulated through housing 10 via lubricant port 32 and vent port 33 to draw heat away from rotary shaft sealing assembly 2 and rotary shaft 4. If lubricant circulation is not required, vent port 33 is ordinarily plugged.

Lubricant supply 11 may take any suitable form or configuration without departing from the spirit or scope of the present invention. For example, if the lubricant is water, a suitable lubricant supply 11 system could simply be the local municipal water system, or water transported by gravity from a spring, or water pumped from a well and held in reserve in a customary well water pressure tank or elevated gravity-feed tank. For another example, the lubricant can be supplied from a typical air-over-oil reservoir, where a pressurized gas imparts pressure to the lubricant. For another example, the lubricant could be gravity fed from lubricant supply 11, with gravity providing the pressure to move the lubricant into housing 10. For another example, the lubricant can be supplied from a spring and/or process fluid pressure amplified piston-type lubricator-amplifier or as shown by the first pressure stage lubricant reservoir of commonly assigned U.S. Pat. No. 6,007,105. For another example, the lubricant can be supplied from a reservoir by a pump. For another example, the lubricant can be supplied from an accumulator or piston or bladder type transfer barrier, pressurized by a gas or liquid pressure.

In prior art sealing arrangements for oilfield cement pumps, which use a plurality of conventional cantilever lip seals, a primary failing has been the inadequacy of the cantilever lip seals to contain the pressurized lubricant at the high rotary speeds common to pumps. The pressure-retaining seal would fail very prematurely from friction and heat caused by the lubricant pressure, causing rapid and complete loss of seal lubricant to the environment from the air-over-oil lubricant reservoir. This premature failure of the pressure-retaining seal, and the associated loss of seal lubricant, led to rapid failure of the remaining process-facing seals, and loss of cement to the ground. Since several pumps are sometimes fed by the same lubricant supply 11, failure of the seals in one pump can also cause the seals in other pumps to fail.

A key feature of several embodiments of the present invention, including the embodiments shown in FIGS. 1 and 4-9, is the use of a wavy-edged hydrodynamic seal 34 of generally circular ring-like configuration to retain the pressurized lubricant within the housing 10, and prevent the sudden, premature loss of lubricant to the second fluid 36, which is ordinarily the earth's air environment. Wavy-edged hydrodynamic seal 34 which is shown schematically in FIG. 1, and shown in detail in FIGS. 2A-2E, provides for hydrodynamic wedging of the lubricant into the dynamic interface between wavy-edged hydrodynamic seal 34 and rotary shaft 4, as taught by commonly assigned U.S. Pat. No. 4,610,319, to reduce the typical dry rubbing wear and heat generation associated with conventional non-hydrodynamic seals. Wavy-edged hydrodynamic seal 34 is positioned by, and has a static sealed relationship with, housing 10.

It is to be understood that the pressure-generating seal rings 44 shown in FIGS. 3A-3F are a subset of wavy-edged hydrodynamic seal 34 as used in this application. Thus, the term "wavy-edged hydrodynamic seal 34" is intended to encompass the seals of FIGS. 2A-2E and 3A-3F whereas the term "pressure-generating seal ring 44" is intended to refer to the seals of FIGS. 3A-3F. It is to be further understood that when water is the lubricant fluid, then the wavy-edged hydrodynamic seal 34 preferably includes a diverting feature and is a seal of the type shown in FIGS. 3A-3F.

A preferred embodiment of the wavy-edged hydrodynamic seal 34 is shown in detail by FIG. 2A, but a suitable embodiment may be selected from any of the seals shown by FIGS. 2A-2E, 3A, 3C, 3D and 3F. A key feature of those seals is that the seal is not of the solid construction shown in U.S. Pat. No. 4,610,319 which causes the dynamic sealing lip to be heavily loaded against the rotary shaft. Rather, the wavy-edged hydrodynamic seal 34 is constructed in a manner that causes the dynamic sealing lip 96 to be lightly loaded against the rotary shaft 4, which allows the seal to run with adequate lubrication, and much lower friction and seal generated heat, compared to a seal with solid construction.

Wavy-edged hydrodynamic seal 34 is far better suited to pressurized lubricant retention, compared to the prior art lip seals that have been used in pumps. The prior art seals are not well supported to receive the pressure, and the pressure causes them to more or less flatten against the shaft, which causes a large dry friction contact area with the shaft, and accompanying high friction and heat, and rapid seal and shaft wear. Wavy-edged hydrodynamic seal 34 is well-supported to receive the lubricant pressure, does not deform unduly by the pressure, presents only a narrow interfacial contact footprint with the shaft, and the interfacial contact footprint is well lubricated. As a result, friction and seal-generated heat are low, and seal and shaft wear are substantially eliminated, providing long sealing life.

Although first supporting wall 37 and second supporting wall 38 are shown in FIG. 1 to be in fixed, permanent relation to one another, such is not intended to limit the scope of the invention, for the invention admits to other equally suitable forms. For example, first supporting wall 37 and/or second supporting wall 38 could be configured to be detachable from housing 10 for ease of maintenance and repair, but then assembled in more or less fixed location for locating the seal. As another example, first supporting wall 37 can be fabricated as part of wavy-edged hydrodynamic seal 34.

The seal assembly of the present invention preferably incorporates a pressure-generating seal ring 44 of generally circular ring-like configuration that is positioned by housing 10. Pressure-generating seal ring 44 is illustrated schematically in FIG. 1 and illustrated in detail in FIGS. 3A-3F. Pressure-generating seal ring 44 and wavy-edged hydrodynamic seal 34 establish a sealed, lubricant-filled region 46 that is supplied with lubricant by the lubricant port 32, and establishes a sealed region 48 between pressure-generating seal ring 44 and the one or more cantilever lip seals 22.

Although first groove wall 42 and second groove wall 43 are shown to be in fixed, permanent relation to one another, such is not intended to limit the scope of the invention, for the invention admits to other equally suitable forms. For example, first groove wall 42 and/or second groove wall 43 could be configured to be detachable from housing 10 for ease of maintenance and repair, but then assembled in more or less fixed location for locating the seal (for examples, see FIGS. 5 and 7).

A performance attribute of pressure-generating seal ring 44 is the ability to serve as a miniature pump to generate a generous controlled flow of pressurized lubricant from the lubricant-filled region 46 into sealed region 48 in response to relative rotation, even in the absence of lubricant pressure in lubricant-filled region 46. The special geometry attributes of pressure-generating seal ring 44 are discussed in detail in conjunction with FIGS. 3A-3F. The flow of pressurized lubricant into sealed region 48 causes lubricant pressure to act on the inside surface 24 of cantilever lip 26, causing cantilever lip 26 to lift away from rotary shaft 4, allowing lubricant to pass between cantilever lip 26 and rotary shaft 4, and ultimately into first fluid 6. The controlled flow of lubricant between cantilever lip 26 and rotary shaft 4 lubricates the dynamic interface between cantilever lip 26 and rotary shaft 4, to reduce the typical dry rubbing wear and heat generation associated with conventional seals, and flushes contaminates away from the one or more cantilever lip seals 22. Depending on seal construction and the rotary speed of rotary shaft 4, the pressure-generating seal ring 44 can generate lubricant pressures of up to 600 PSI; e.g. more than 60 times the pressure typically required to lift the cantilever lip 26 of the one or more cantilever lip seals 22. At the typical pump speed of 1800 rpm on a 2.75" shaft, seal geometries have been developed that can produce flow rates as high as 7.5 ml/minute with water, and as high as 181.9 ml/minute with an ISO 320 viscosity grade lubricant. The flow rate of pressure-generating seal ring 44 is primarily controlled by lip geometry, lip load against the shaft, the rotational speed of rotary shaft 4, and lubricant viscosity.

As discussed previously, when lip seals have been used in the prior art in elevated pressure environments to protect hydrodynamic seals, there were problems unless the lip seals were defeated in some way, such as by cutting the lip so that a true sealed relationship was not attained, or the region between the seals was pressure-balanced to the environment. This is overcome in the present invention by the ability of pressure-generating seal ring 44 to rapidly fill and pressurize sealed region 48. Tests performed by the inventors and their associates show that after initial assembly, sealed region 48 fills up and becomes pressurized within mere seconds of the commencement of initial rotation of rotary shaft 4, and just as quickly begins to lubricate the one or more cantilever lip seals 22. This rapid filling and pressurization of sealed region 48 is augmented by the start-up leakage rate characteristics of pressure-generating seal ring 44. During the first five minutes or so of startup the leak rate of pressure-generating seal ring 44 is significantly higher than the steady state leak rate, because the viscosity of the lubricant is much thicker at startup, compared to its viscosity under steady state temperature conditions. If desired, cantilever lip seal 22 can incorporate the hydrodynamic geometry of FIGS. 2A-3F so that interfacial lubrication of cantilever lip seal 22 commences instantaneously with rotational startup, rather than being delayed by several seconds as sealed region 48 initially fills. Such is really not necessary, however, because after sealed region 48 is initially filled, it stays filled after rotation stops, so when restart occurs the re-pressurization of sealed region 48 is very quick, and therefore flushing and lubrication of cantilever lip seal 22 begins even quicker, compared to the initial startup. In other words, incorporating hydrodynamic geometry on cantilever lip seal 22 would only be of benefit during the first few seconds when the shaft is initially rotated, which is largely irrelevant. Thus, the pressure-generating seal ring 44 allows the cantilever lip seal 22 to be of a conventional, simple construction that is available at commodity prices, yet it causes the cantilever lip seal 22 to perform as well as more complicated, fully hydrodynamic seals.

The pressure and flush generating capability of pressure-generating seal ring 44 also overcomes the prior art cement pump lip seal arrangement, wherein the lubricant supply was absolutely required to be pressurized, in order to prevent process fluid (first fluid 6) pressure-induced distortion and destruction of the lip seals, and in order to lubricate and flush the lip seals. Pressure-generating seal ring 44 also overcomes the need to meter the lubricant flow with an orifice, needle valve or the like, and eliminates the problems associated with the prior art methods of metering the lubricant flow. For example, the viscosity of the lubricant changes significantly with lubricant temperature, so a needle valve that was set on a hot day will provide insufficient flow and pressure to the prior art lip seals on a cold day, and the seals will fail quickly. For another example, metering devices such as orifices, needle valves or the like are highly prone to blockage by line contaminants, which leads to rapid failure of the prior art lip seals. In the preferred embodiment of the present invention, pressure-generating seal ring 44 performs the metering function that was previously performed by orifices, needle valves or the like, and does not require their use. Thus, pressure-generating seal ring 44 replaces the problematic prior art metering devices with a simple, one piece, clog-resistant component that does not have to be adjusted for ambient temperature conditions in order to function properly.

Although the ability of the pressure-generating seal ring 44 to generate a significant flow rate is quite unique for a seal, it is equally true that compared to the 4 to 5 gallon per minute flush rate typically used with mechanical face seals, the flow produced by pressure-generating seal ring 44 is relatively slow. This flow rate facilitates the contaminant settling action of the natural gravity trap and optional "seal pot" that were discussed previously.

When relative rotation occurs between housing 10 and rotary shaft 4, the cantilever lip seal 22, wavy-edged hydrodynamic seal 34 and pressure-generating seal ring 44 and outboard barrier seal 70 remain stationary with respect to housing 10 and maintains static sealing relationships therewith, while the interface between the seals and rotary shaft 4 becomes a dynamic sealing interface. The relative rotation direction is normal (perpendicular) to the plane of the cross-section depicted in FIG. 1, and approximately concentric to shaft surface 68.

When relative rotation is absent, a liquid tight static sealing relationship is maintained at the interface between pressure-generating seal ring 44 and housing 10, and at the interface between pressure-generating seal ring 44 and rotary shaft 4. This is a significant improvement over prior art cement pump lip seal arrangements, where the lip seals would continue to leak oil as long as the lubricant remained pressurized. In terms of pressure-generating seal ring 44 acting as a miniature pump, its ability to seal when rotation of rotary shaft 4 has stopped is different than some other conventional pumps, such as centrifugal pumps, which will continue to leak when operation ceases, if a pressurized fluid is present at the pump inlet. This feature greatly simplifies operation, because the pump operator does not have to turn the pressure off to prevent leakage when the pump is stopped, and therefore doesn't have to remember to turn the pressure back on before restarting the pumps. This may not sound significant, but remember the pump is ordinarily just one minor detail of a complex material handling/processing apparatus that the operator is dealing with. With the prior art seals, if the operator simply forgets to turn the lubricant pressure on before the pump is started, the seals quickly fail and the functionality of the entire material handling/processing apparatus can be lost.

In the preferred embodiment, a throat ring 50 is incorporated to serve one or more functions. One function of throat ring 50 is to protect the one or more cantilever lip seals 22 from being impacted by large particles that may be present within first fluid 6. Another function of throat ring 50 is to provide a dilution zone 52 wherein the process fluid abrasives are somewhat diluted by the lubricant flow between cantilever lip 26 and rotary shaft 4. Another function of throat ring 50 is to prevent gross lateral motion of rotary shaft 4 during events such as cavitation-induced shaft vibration.

Throat ring 50 can be retained by any suitable means without departing from the spirit or scope of the invention, such as the retaining ring 54 that is illustrated. Other examples of suitable retention means for throat ring 50 would be threaded retention (see FIG. 6), an interference fit with housing 10 (see FIG. 5), or even integral construction with housing 10 (see FIG. 7).

Any suitable material may be used in construction of the housing 10 and throat ring 50, including various metals and plastics, however the preferred basic material of construction is metal due to its high modulus of elasticity, high strength, and high thermal conductivity.

Referring to FIG. 1, an instrument port 56 may be incorporated so that an outboard pressure sensor 58 (shown schematically) can be used to sense the lubricant pressure within sealed region 48 that is established by pressure-generating seal ring 44 during rotation of rotary shaft 4. When the one or more cantilever lip seals 22 are new, a measurable pressure is present within sealed region 48; e.g. the pressure required to lift (e.g. vent) and flush cantilever lip 26. As the one or more cantilever lip seals 22 fail, the pressure within sealed region 48 drops to match the pressure on the process fluid side of cantilever lip seal 22; i.e., the pressure in first fluid 6 near rotary shaft 4. Although the rotary shaft sealing assembly 2 will function for a prolonged period of time after the failure of cantilever lip seal 22 by virtue of the presence of pressure-generating seal ring 44, by detecting the pressure change associated with the failure of cantilever lip seal 22, the pump operator is able to schedule maintenance long before total failure of rotary shaft sealing assembly 2. Since rotary shaft sealing assembly 2 can continue to operate even when the cantilever lip seal 22 has failed, one alternate embodiment of rotary shaft sealing assembly 2 for light duty service would be the elimination of the one or more cantilever lip seals 22.

Figure 6:
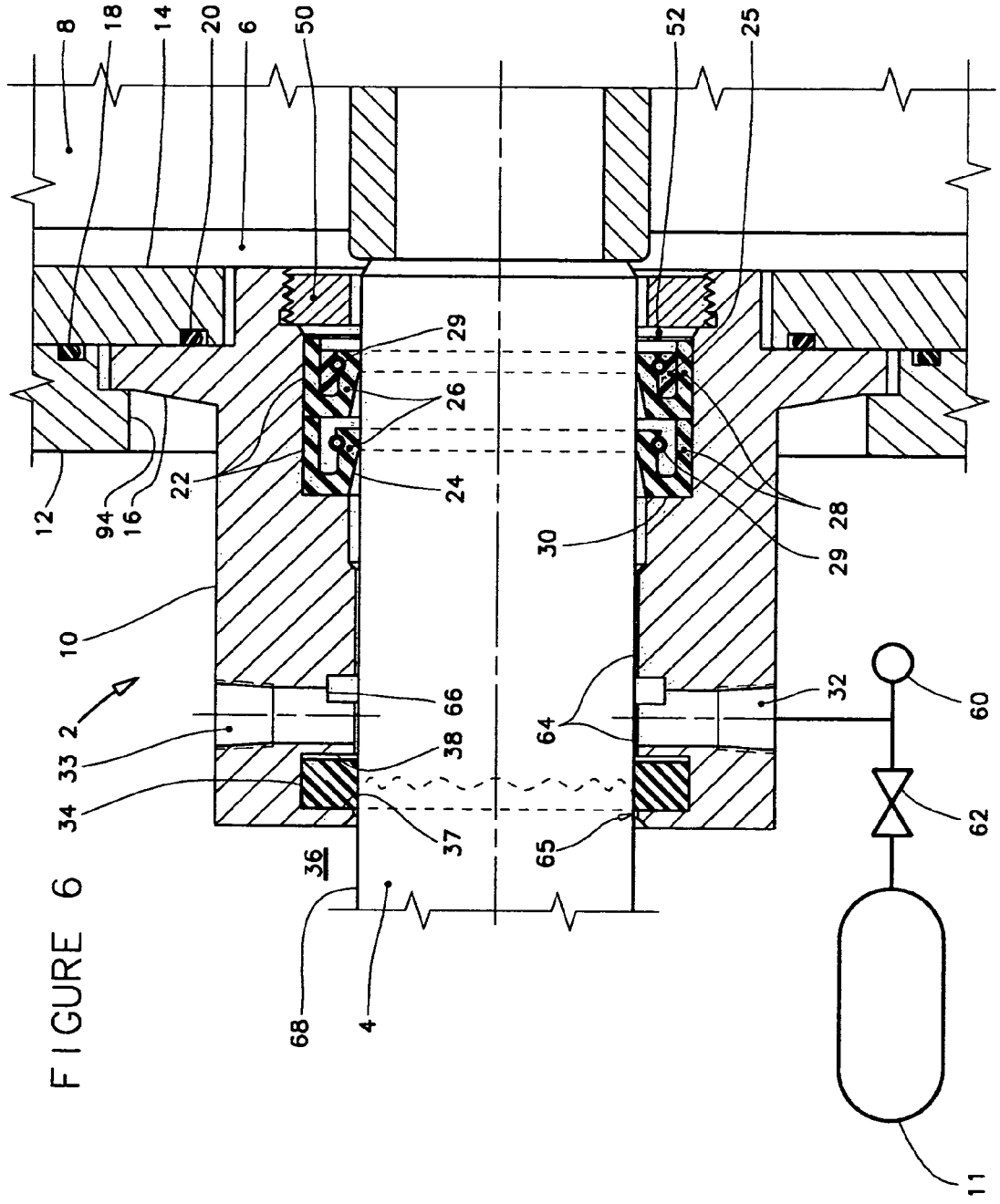
FIG. 6 is an elevation view, in cross-section, of a rotary seal assembly according to another embodiment of the present invention, the embodiment including one or more cantilever lip seals and a wavy-edged hydrodynamic seal in sealing engagement with a rotary shaft and a housing.

The pressure-generating seal ring 44 ordinarily outlasts the one or more cantilever lip seals 22 because it is isolated from the deteriorating effects of the first fluid 6, but in theory at least, pressure-generating seal ring 44 could fail before the one or more cantilever lip seals 22 due to circumstances such as shaft surface defects, or seal defects. Should pressure-generating seal ring 44 fail before the one or more cantilever lip seals 22, the pressure within sealed region 48 that is monitored by outboard pressure sensor 58 will change to match the pressure at lubricant port 32, which can be monitored by an inboard pressure sensor 60 (shown schematically). The seal assembly will function for a prolonged period of time after the failure of pressure-generating seal ring 44 so long as the lubricant supply pressure at lubricant port 32 is greater than the pressure within first fluid 6, because the lubricant pressure will cause cantilever lip 26 to lift away from rotary shaft 4, allowing lubricant to pass between cantilever lip 26 and rotary shaft 4, and ultimately into first fluid 6, thus flushing and lubricating the one or more cantilever lip seals 22. To control the lubricant flow rate from the lubricant supply 11 into the first fluid 6 under such a failure condition, a flow control 62 (shown schematically) can be employed. By detecting the pressure change associated with the failure of pressure-generating seal ring 44, the pump operator is able to schedule maintenance before total failure of rotary shaft sealing assembly 2. Since rotary shaft sealing assembly 2 can continue to operate even when the pressure-generating seal ring 44 has failed, one alternate embodiment of rotary shaft sealing assembly 2 for light duty service would be the elimination of the pressure-generating seal ring 44, as shown in FIGS. 6 and 7.

If desired, outboard pressure sensor 58 and/or inboard pressure sensor 60 can be of the type that provides a voltage that can be used to provide annunciation, so that seal integrity can be monitored from a remote location, and/or can be used to control rotation of rotary shaft 4.

For example, if the pressure from outboard pressure sensor 58 indicates that the one or more cantilever lip seals 22 have failed, or if pressure from inboard pressure sensor 60 indicates that the pressure-generating seal ring 44 has failed, the voltage from the sensor can be used to signal the failure to the person or department responsible for pump maintenance so that a planned shut-down can be scheduled for maintenance, or it could be used to automatically stop rotation of rotary shaft 4.

For another example, if the inboard pressure sensor 60 indicates that little or no lubricant pressure is present, the voltage from the sensor could be used to prevent or stop rotation of rotary shaft 4.

Preferably, one or more journal bearing surfaces 64 are provided within housing 10 to limit the misalignment between housing 10 and rotary shaft 4 during installation of rotary shaft sealing assembly 2, and to limit lateral deflection of rotary shaft 4 during operation. Since lateral deflection of rotary shaft 4 could theoretically block lubricant port 32 and cause lubricant starvation of pressure-generating seal ring 44 and/or the one or more cantilever lip seals 22, a lubricant groove 66 is preferably incorporated to assure an uninterrupted flow of oil to pressure-generating seal ring 44 and/or the one or more cantilever lip seals 22.

In the prior art mechanical face seal arrangements for paper pulp pumps, face breakage resulted in large openings that allowed large quantities of the process fluid to leak out of the pump. In rotary shaft sealing assembly 2, even if all of the rotary seals fail, the process fluid leak rate would be relatively slow, owing to the small clearance between journal bearing surface 64 and rotary shaft 4.

Shaft surface 68 may be treated with a low friction and/or hard surfacing treatment such as a nickel or cobalt based sprayed and fused coating, tungsten carbide coating, diamond coating, boronizing, hard chrome coating, nitriding, carburizing, colmonoy coating, stellite coating or other welded hardfacing, or other surface enhancement coatings or surface modification techniques, including ion beam deposition, to enhance the wear resistance and frictional properties thereof.

Journal bearing surface 64, may be treated with a low friction treatment such as a PTFE or copper-based coating, or other surface enhancement coatings or surface modification techniques to enhance the wear resistance and frictional properties thereof. Journal bearing surface 64 may, if desired, be lined with a bearing material such as bearing bronze and other copper based bearing materials including copper-lead, leaded bronze and tin bronze, or such as babbitt, cadmium-based alloys, silver, sintered metal including silver infiltrated porous metal, or such as plastic, or reinforced plastic. Journal bearing surface 64 may also be part of a separate replacement component, as shown in FIGS. 7 and 8.

Although a specific radial bearing arrangement has been discussed, such is not intended to be in any way limiting of the scope of this invention. Bearing means other than the journal bearing means shown may be incorporated in conjunction with the present invention without departing from the spirit or scope thereof. For example, needle roller bearings, cylindrical roller bearings, ball bearings, angular contact bearings, plastic journal bearings, or tapered roller bearings may be substituted for the closely fitting journal bearing-type relationship between journal bearing surface 64 and rotary shaft 4.

The one or more extrusion gap bores 65 are preferably larger in diameter than journal bearing surface 64 so that any rubbing contact between rotary shaft 4 and housing 10 occurs at journal bearing surface 64 and not at the extrusion gap bore 65. This relationship insures that any frictional heat occurring from contact between rotary shaft 4 and housing 10 occurs at a region remote from the extrusion gap bore 65, which protects the rotary seals from heat damage.

In certain types of centrifugal pumps, such as those used in the manufacture of paper, the shaft is adjusted axially in service to adjust for impeller wear. When water is used as the lubricant for rotary shaft sealing assembly 2, the water is hydrodynamically pumped through the dynamic interface between wavy-edged hydrodynamic seal 34 and the rotary shaft 4, and onto shaft surface 68. If not otherwise addressed, the water would evaporate from the shaft and leave an abrasive evaporative deposit on shaft surface 68. Such a deposit can be abrasive to the wavy-edged hydrodynamic seal 34 when the rotary shaft 4 is adjusted axially, and unless addressed, would limit seal life. One way to address such deposits is by filtering the water to remove the mineral content from the water.

In water lubricated applications, it is preferred that one or more outboard barrier seals 70 of generally circular configuration be employed to prevent evaporation by keeping the outboard sealed region 72 flooded with water. By preventing evaporation in outboard sealed region 72, evaporative deposits are prevented that could otherwise harm wavy-edged hydrodynamic seal 34 when rotary shaft 4 is adjusted axially. It is also preferred that shaft surface 68 be coated with grease to prevent adherence of evaporative deposits. If two outboard barrier seals 70 are used, grease can be placed between them.

Outboard barrier seal 70 may be of any type or configuration of lightly loaded seal that is suitable for retention of low pressure fluids, such as, but not limited to, a PTFE-based lip seal or a spring-energized elastomeric cantilever lip seal. For best results, outboard barrier seal 70 should be tolerant of some dynamic runout and lateral offset of rotary shaft 4. It is preferred that outboard barrier seal 70 be constructed of a low friction material, such as, but not limited to, carbon-graphite-filled PTFE, or elastomer having a low-friction additive and/or surface treatment. Examples of such materials would be CDI 25% carbon-graphite-filled PTFE compound No. 711, and Parker elastomer compound No. N4274A85.

Although first groove wall 71 and second groove wall 73 are shown to be in fixed, permanent relation to one another, such is not intended to limit the scope of the invention, for the invention admits to other equally suitable forms. For example, first groove wall 71 and/or second groove wall 73 could be configured to be detachable from housing 10 for ease of maintenance and repair, but then assembled in more or less fixed location for locating the seal. Alternately, the outboard barrier seal 70 could be friction retained (as shown in FIG. 5), eliminating the need for first groove wall 71.

In applications where rotary shaft 4 is vertical, outboard sealed region 72 is kept substantially flooded with water (to minimize evaporative mineral deposits) by orienting a standpipe 78 such that the standpipe mouth 80 is at a higher elevation than outboard barrier seal 70. In applications where rotary shaft 4 is vertical, vent port 33 and lubricant port 32 should be placed as close as practical to wavy-edged hydrodynamic seal 34 to minimize the risk of an air pocket near wavy-edged hydrodynamic seal 34 that might interrupt its lubrication. For example, see FIG. 4, where lubricant port 32 and vent port 33 intercept second supporting wall 38.

In applications where rotary shaft 4 is horizontal, standpipe 78 is unnecessary, and outboard sealed region 72 is kept flooded with water by orienting exit port 74 on the top of rotary shaft sealing assembly 2 during installation. The hydrodynamic leakage of wavy-edged hydrodynamic seal 34 fills outboard sealed region 72, and then leaks out the top of housing 10 through exit port 74, and into annular overflow groove 76, whereupon gravity causes the leakage to drip off of the lower side of housing 10.

Obviously, as an alternative, the leakage could be transferred to a suitable collection container via tubing or pipe; for example if the lubricant were water it could be routed to the pulp tank of a paper mill, or routed to a drain.

In applications where rotary shaft sealing assembly 2 is exposed to abrasive conditions, such as road dust, road splash, or spilled process fluid, it is preferred that a rotating dust cover 82 be used to protect wavy-edged hydrodynamic seal 34 and/or outboard barrier seal 70. The rotating dust cover 82 telescopes partially over rotary shaft sealing assembly 2 as a shield, and is retained to the rotary shaft 4 by one or more set screws 85, or by other suitable means. The dust cover 82 may incorporate fan blades 83 for providing air cooling of rotary shaft sealing assembly 2.

It is preferred that a weir 86 project inside dust cover seal 84 to act as a shield to prevent contaminants from entering the clearance between housing 10 and rotary shaft 4. In applications where rotary shaft 4 is vertical, the projecting length 90 of weir 86 exploits gravity to prevent any liquid contaminants that may be lying on end surface 88 from entering the clearance between housing 10 and rotary shaft 4.

Weir 86 preferably incorporates a drainage groove 92. In applications where rotary shaft 4 is horizontal, liquid contaminants entering the clearance between rotating dust cover 82 and housing 10 drip into drainage groove 92, whereupon gravity causes the liquid contaminants to drip harmlessly off of the lower side of drainage groove 92.

Pumps typically provide a pilot bore 94 for alignment of conventional stuffing boxes. If desired, pilot bore 94 may be used to align housing 10, as shown in FIGS. 5, 7 and 8, however the pilot bore 94 is often so worn and/or corroded that it is no longer accurate. It is preferred that sufficient clearance be provided between the pilot bore 94 and housing 10 to permit the compressive force of the rotary seals within housing 10 to align housing 10 with the shaft 4 during installation of housing 10. To achieve optimum alignment, it is preferred that the housing 10 be installed with the rotary shaft 4 temporarily positioned in a vertical orientation.

In review, among the various features that cause preferred embodiments of the present invention to outperform the prior art are the use of wavy-edged hydrodynamic seal 34 to contain the pressurized lubricant, and the use of a pressure-generating seal ring 44 that pumps pressurized lubricant through the dynamic interface between the rotary shaft 4 and the one or more cantilever lip seals 22, even in the event that pressure from lubricant supply 11 is absent, in order to flush and lubricate cantilever lip seal 22.

Description of FIGS. 2A-2E

Referring now to the fragmentary longitudinal cross-sections of FIGS. 2A-2E, design criterion for wavy-edged hydrodynamic seal 34 will be described. In FIGS. 2A-2E, the wavy-edged hydrodynamic seal is shown generally at 34, and rotary shaft 4, which has a relative rotation direction 134, is not shown so that the features of the seal can be seen. In FIGS. 2A-2C, wavy-edged hydrodynamic seal 34 is shown installed within housing 10, while in FIGS. 2D and 2E, housing 10 is not shown.

Significant design criterion for wavy-edged hydrodynamic seal 34 are (1) to have a geometry that produces hydrodynamic lubrication of the dynamic sealing interface between the wavy-edged hydrodynamic seal 34 and rotary shaft 4, while (2) avoiding the high initial interfacial contact pressure associated with the solid seal cross-sections depicted in U.S. Pat. Nos. 4,610,319, 5,230,520, 6,120,036, 6,315,302 and 6,382,634. One technique for reducing interfacial contact pressure can be accomplished by using an energizer element 29, as shown in FIGS. 2A-2E, and discussed below. In FIGS. 2A-2C, the reduction of interfacial contact pressure can also be accomplished by eliminating the energizer element 29, and relying on stretch of hydrodynamic lip 96 for the necessary interfacial contact pressure.

Wavy-edged hydrodynamic seal 34 incorporates a hydrodynamic lip 96 that defines a dynamic surface 98 for contacting shaft surface 68 of rotary shaft 4. Hydrodynamic lip 96 is configured such that when it is compressed against rotary shaft 4, an interfacial contact footprint of generally circular form is established that has a wavy edge facing the lubricant-filled region 46 within housing 10. The interfacial contact footprints of rotary seals are illustrated as hidden (e.g. dashed) lines in FIGS. 1, 4 and 6-9. Preferably, hydrodynamic lip 96 is also configured such that when it is compressed against rotary shaft 4 the resulting interfacial contact footprint has a circular edge generally facing second fluid 36.

In the examples shown in FIGS. 2A-2E, the dynamic surface 98 has a wavy edge generally at 100 that is illustrated as being established by intersection with a wavy flank 102, but can also be established by other means; for example the hydrodynamic geometry construction of FIGS. 3A-3F can be used. Although the intersection between dynamic surface 98 and wavy flank 102 is blended by hydrodynamic inlet 116, wavy edge 100 is illustrated as a line at the theoretical intersection in accordance with American drafting third angle projection conventional representation, where theoretical intersections blended by curves are projected as lines (For a discussion of this general blended intersection illustration practice see paragraph 7.36 and FIG. 7.44(b) on page 213 of the textbook "Technical Drawing", 10th edition (Prentice-Hall, Upper Saddle River, N.J.: 1997).

Dynamic surface 98 preferably also has a circular edge 106 which for exclusionary purposes is substantially aligned with relative rotation direction 134 and therefore does not generate a hydrodynamic wedging action in response to relative rotary motion. Circular edge 106 may be abrupt as shown in FIGS. 2D and 2E for improved exclusion.

During rotation of rotary shaft 4, hydrodynamic inlet 116, by virtue of the skew provided by wavy edge 100, hydrodynamically wedges lubricant from lubricant-filled region 46 into the dynamic sealing interface between hydrodynamic lip 96 and rotary shaft 4, causing the lubricant to migrate past circular edge 106 which reduces wear, torque and heat generation.

The geometry of hydrodynamic inlet 116 is present at least on the leading edges of the waves (relative to the relative rotation direction 134 of rotary shaft 4), and can take any suitable design configuration that results in a gradually converging relationship with the shaft, in a skewed orientation for promoting hydrodynamic wedging without departing from the spirit or scope of the present invention, including any type of curve, such as but not limited to a radius, a portion of an ellipse, a portion of a sine wave curve, a portion of a parabolic curve, a portion of a cycloid curve, a portion of witch/versiera curves, or combinations thereof, etc.

The waviness of wavy edge 100 can take any form which is skewed with respect to the direction of relative rotation between rotary shaft 4 and dynamic surface 98, and could take the form of one or more repetitive or non-repetitive convolutions/waves of any form including a sine, saw-tooth or square wave configuration, or plural straight or curved segments forming a tooth-like pattern, or one or more parabolic curves, cycloid curves, witch/versiera curves, elliptical curves, etc. or combinations thereof, including any of the design configurations shown in commonly assigned prior art patents.

When the dynamic surface 98 of hydrodynamic lip 96 is compressed against rotary shaft 4, wavy edge 100 causes one edge of the interfacial contact footprint to be wavy (see the hidden line representation of the footprint in FIGS. 1, 4 and 6-9.)

In FIGS. 2A-2C, the high initial interfacial contact pressure associated with the solid seal cross-sections depicted in U.S. Pat. Nos. 4,610,319, 5,230,520, 6,120,036, 6,315,302 and 6,382,634 is avoided by constructing hydrodynamic lip 96 as a cantilever-type sealing lip that is preferably supported by an angulated surface 110 portion of first supporting wall 37. The flexing lip construction of hydrodynamic lip 96 relieves much of the contact pressure at the interface between the hydrodynamic lip 96 and rotary shaft 4 that would otherwise occur if the seal were of the direct compression type, thereby helping to assure sufficient hydrodynamic lubrication. The flexible lip construction also permits the use of relatively high modulus materials that would otherwise be unsuitable for use in a solid seal due to the high interfacial contact pressure that would result. The use of a higher modulus material helps the seal to resist pressure-induced distortion and extrusion. With the type of seal shown in FIGS. 2A-2C, it is preferred that the first supporting wall 37 be provided by a component that is separable from the stuffing box, such as making the first supporting wall 37 a component part of the seal, or such as making the first supporting wall 37 part of a gland follower as shown in FIGS. 7 and 8.

In FIGS. 2A-2C, owing to the complimentary shapes of the hydrodynamic lip 96 and the mating angulated surface 110 portion of first supporting wall 37, the hydrodynamic lip 96 is well supported in a manner that resists distortion and extrusion of the seal when the pressure of the lubricant within lubricant-filled region 46 is higher than the pressure of second fluid 36.

In FIGS. 2A-2E, an energizer element 29 that has a different modulus of elasticity compared to hydrodynamic lip 96, is used to help maintain contact between hydrodynamic lip 96 and rotary shaft 4. Hydrodynamic lip 96 may also be made smaller than the shaft, so that stretch of hydrodynamic lip 96 onto rotary shaft 4 is used to help to maintain contact therebetween, helping to make the seal tolerant of runout, misalignment, tolerances, and permanent set. In FIGS. 2A and 2B, energizer element 29 has a higher modulus of elasticity than hydrodynamic lip 96, to provide fast response to shaft runout. In FIG. 2A, energizer element 29 is illustrated as a garter spring, and in FIG. 2B it is illustrated as a cantilever spring. In FIGS. 2C and 2D, energizer element 29 is illustrated schematically, and can be any type of energizer known in the art, such as a canted coil spring or a resilient elastomeric portion of the seal that has a lower modulus of elasticity compared to the modulus of elasticity of hydrodynamic lip 96. Energizer element 29 can take any of a number of suitable forms known in the art, including soft elastomer inserts and various forms of springs such as garter springs, canted coil springs, and cantilever springs, without departing from the scope or spirit of the invention.

If desired, any of the seals herein can have anti-rotation projections 112 such as shown in FIG. 2D for engaging mating recesses within housing 10 to prevent seal slippage and rotation within housing 10. For example, see FIG. 4, where anti-rotation projection 112 engages the recess in second supporting wall 38 formed by lubricant port 32. FIG. 2D is intended to be interpreted by the standard conventions of multi and sectional view orthographic drawing projection practiced in the United States and described in ANSI Y14.3-1975, an Industry Standardization Document promulgated by ASME. Section 3-4.2.1 has been interpreted to mean that the circumferentially solid portions should be cross-hatched in sectional view, while the anti-rotation projections 112 should be drawn in outline form without cross-hatch lines to avoid conveying a false impression of circumferential solidity.

Description of FIG. 3A-3F

Referring now to the fragmentary longitudinal cross-sections of FIGS. 3A-3F, the design criterion for pressure-generating seal ring 44 will be described.

In the preferred embodiment of the invention, the pressure-generating seal ring 44 includes a hydrodynamic inlet 116 in combination with one or more contrasting and complimentary angled diverting features (118A-118D), which cooperate to generate a generous flow of lubricant in response to relative rotation of rotary shaft 4, and to produce pressure along with the flow of lubricant.

Pressure-generating seal ring 44 incorporates a hydrodynamic lip 96 that defines at least one dynamic surface 98 for contacting shaft surface 68 of rotary shaft 4. Hydrodynamic lip 96 is configured such that when it is compressed against rotary shaft 4, an interfacial contact footprint of generally circular form is established that has a wavy footprint edge 47 (see hidden line representation in FIGS. 1, 4, 8 and 9) facing the lubricant-filled region 46 within housing 10. Preferably, hydrodynamic lip 96 is also configured such that when it is compressed against rotary shaft 4 the resulting interfacial contact footprint has a circular edge 106 (commonly known as an exclusionary edge) for excluding first fluid 6 should the one or more cantilever lip seals 22 fail.

In the examples shown in FIGS. 3A-3C, the dynamic surface 98 has a blended boundary 114 that is substantially a tangency with dynamic surface 98. Dynamic surface 98 preferably also has a circular edge 106 which for exclusionary purposes is substantially aligned with the direction of relative rotation direction 134 of rotary shaft 4 and therefore does not generate a hydrodynamic wedging action in response to relative rotary motion. Circular edge 106 may be abrupt as shown for improved exclusion.

Preferably, a hydrodynamic inlet 116 is provided, to create a gentle convergence with shaft surface 68 of rotary shaft 4 for efficient hydrodynamic wedging of lubricant into the dynamic interfacial footprint between rotary shaft 4 and dynamic surface 98. Diverting geometry is provided that helps to minimize the lubricant that otherwise would escape at the trailing edges of the waves, and forces the lubricant axially, producing a generous flow of lubricant past circular edge 106, and provides the ability to generate pressure with the flow of lubricant.

The geometry of hydrodynamic inlet 116 can take any suitable design configuration that is skewed relative to relative rotation direction 134 and results in a gradually converging geometry for promoting hydrodynamic wedging without departing from the spirit or scope of the present invention, including any type of curve, such as but not limited to a radius, a portion of an ellipse, a portion of a sine wave curve, a portion of a parabolic curve, a portion of a cycloid curve, a portion of witch/versiera curves, or combinations thereof, etc. The geometry of hydrodynamic inlet 116 has a gradually converging relationship with the mating shaft surface 68 and is preferably designed to avoid an abrupt rise in interfacial contact pressure at the leading edge of the wave which is conducive to providing efficient hydrodynamic wedging action.

A portion of the lubricant within lubricant-filled region 46 moves with shaft surface 68 and is hydrodynamically wedged into the dynamic interfacial footprint between rotary shaft 4 and dynamic surface 98 by hydrodynamic inlet 116. The resulting interfacial lubricant film moves in roughly the same direction as the relative rotation direction 134 of rotary shaft 4. As the moving lubricant film approaches the angled diverting feature(s), a significant portion of the lubricant is diverted toward circular edge 106 to add to the overall lubricant leakage rate past circular edge 106. The diversion direction is represented schematically by arrow 136.

The angled diverting features 118A-118D may take the form of one or more skewed ridges as shown by angled diverting features 118A that are preferably disposed in spaced relation with respect to one another, or one or more skewed depressions as shown by angled diverting features 118B that are preferably disposed in spaced relation with respect to one another. The angled diverting features may also take the form of a converging shape at the trailing edge of one or more of the waves as shown by angled diverting features 118C which is more abrupt than the gently converging hydrodynamic inlet 116 at the leading edge of the waves.

The angled diverting features establish zones of elevated interfacial contact pressure that are skewed relative to the direction of relative rotation of rotary shaft 4, and cause a local reduction in film thickness that produces a damming effect. Because of the angle of the angled diverting features relative to relative rotation direction 134, in conjunction with the restriction or damming effect, a strong diverting action is produced which pumps lubricant across the dynamic sealing interface and past circular edge 106, and generates pressure within the pumped lubricant. In other words, lubricant enters the dynamic interfacial footprint at hydrodynamic inlet 116, and is diverted axially by the angled diverting feature(s). This diverting action is so powerful that pressure-generating seal ring 44 can actually act as a miniature pump to produce substantial flow and pressure to lubricate and flush a series of other seals; a novel arrangement which is heretofore unknown in the art. The shape of hydrodynamic inlet 116 and the shape and location and specific geometry of the angled diverting features can take other specific forms without departing form the spirit or scope of the present invention.

The hydrodynamic lip 96 is constructed of a sealing material selected for its performance characteristics, and has a predetermined modulus of elasticity. In the preferred embodiment of the present invention, an energizer element 29 that has a different modulus of elasticity than the hydrodynamic lip 96 can be provided to load dynamic surface 98 of hydrodynamic lip 96 against rotary shaft 4, and may also be used to load static sealing surface 125 against housing 10. The energizer element 29 is illustrated schematically in FIG. 3A, and can take any of a number of suitable forms known in the art, including soft elastomers, or various forms of springs having a higher modulus of elasticity than hydrodynamic lip 96, without departing from the scope or spirit of the invention. The energizer interface 126 can also be of any suitable form that is compatible with energizer element 29, including the annular recess shape that is shown in FIGS. 3A and 3D.

Energizer element 29 can be a resilient material having a modulus of elasticity that is different than the predetermined modulus of elasticity of hydrodynamic lip 96. For example, the modulus of elasticity of energizer element 29 could be lower than the predetermined modulus of elasticity of hydrodynamic lip 96 in order to manage interfacial contact pressure to optimum levels for lubrication and low torque.

Energizer element 29 may be bonded to or integrally molded with the rest of the seal to form a composite structure, or can be simply be a separate piece mechanically assembled to the rest of the seal.

FIG. 3B represents a simplification of the preferred embodiment shown in FIG. 3A, wherein the energizer element 29 of FIG. 3A has been eliminated by simply constructing the seal as a solid, generally circular seal composed of resilient sealing material, such as an elastomer. This results in simplified manufacture and lower cost, and potentially better dimensional accuracy, however testing to date shows that solid cross-sections are more suitable for oil lubrication than water lubrication. Testing has also revealed that when water is used as the lubricant, the wavy-edged hydrodynamic seal 34 should preferably be of the energized type shown in FIGS. 3A, 3C, 3D and 3F because of the ability of these seals to produce higher leakage and run cooler with thinner viscosity lubricants (owing to reduced overall contact pressure).

The seal of FIGS. 2D, 2E and 3A-3F may, if desired, incorporate a static sealing lip 125 which may be in generally opposed relation to hydrodynamic lip 96 per the teachings of commonly assigned U.S. Pat. No. 5,230,520 for providing twist resistance via an approximation of compressive symmetry.

Description of FIGS. 3D-3F

In FIGS. 3D-3F, three embodiments of a pressure-generating seal ring 44 that provide a method for controlling lubricant movement are illustrated wherein the hydrodynamic lip 96 is generally circular. One or more pressure manipulation features 120 are located at least partially on dynamic surface 98, and combine the hydrodynamic inlet function and the diverting function into one feature that incorporates a hydrodynamic inlet 116 on the leading edge, and an angled diverting feature 118D near the trailing edge that is more abrupt than the hydrodynamic inlet 116.

Referring to FIGS. 3D-3F, when the pressure-generating seal ring 44 is compressed against the rotary shaft 4, it establishes sealing contact pressure with rotary shaft 4. Because of the pressure manipulation feature 120, when the pressure-generating seal ring 44 is compressed against the rotary shaft 4, the resulting dynamic interfacial footprint has a wavy edge facing lubricant-filled region 46, and has at least one skewed elevated contact pressure zone for diverting lubricant axially in response to relative rotation. In operation, a portion of the lubricant within lubricant-filled region 46 moves with shaft surface 68 and is hydrodynamically wedged into the dynamic interfacial footprint between rotary shaft 4 and dynamic surface 98 by hydrodynamic inlet 116. The resulting interfacial lubricant film moves in roughly the same direction as the relative rotation direction 134 of rotary shaft 4. As the moving lubricant film approaches the angled diverting feature 118D, a significant portion of the lubricant is diverted toward circular edge 106 to add to the overall lubricant leakage rate past circular edge 106, as shown schematically by arrow 136.

The intersection of lip flank surface 121 and dynamic surface 98 is blended by a curve 123. In keeping with American drafting third angle projection conventional representation, theoretical intersections blended by curves in FIGS. 3D-3F are projected as lines, therefore, for example, the theoretical intersection 138 between lip flank surface 121 and dynamic surface 98 is illustrated as a line.

It should be understood that when water is used as the lubricant, the wavy-edged hydrodynamic seal 34 should incorporate at least one of the angled diverting features 118A-118D that are shown in FIGS. 3A-3F.

Figure 4:
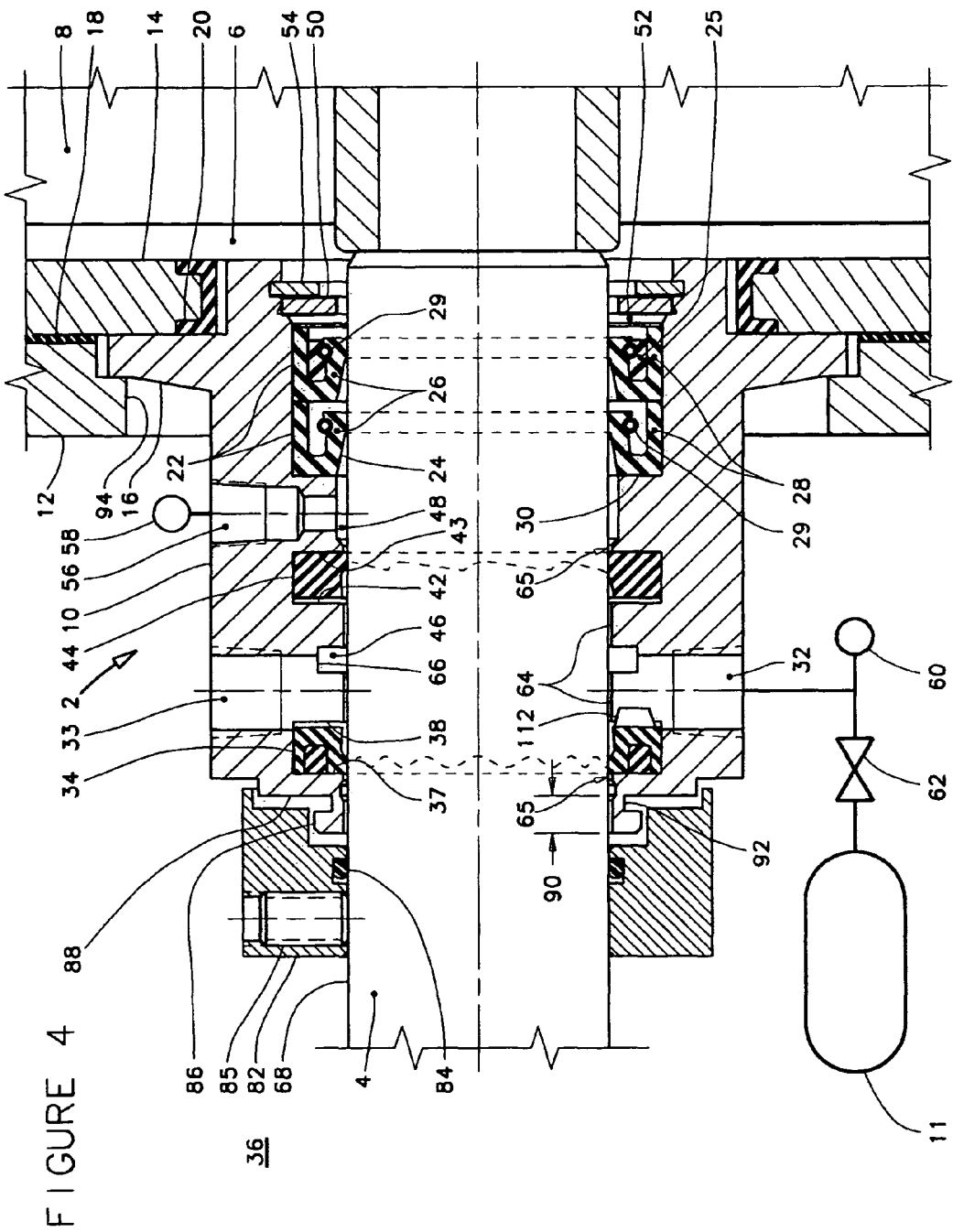
FIG. 4 is an elevation view, in cross-section, of a rotary seal assembly according to another embodiment of the present invention, the embodiment including one or more cantilever lip seals, a pressure-generating seal ring, and a wavy-edged hydrodynamic seal in sealing engagement with a rotary shaft and a housing.

Description of FIG. 4

FIG. 4 is an embodiment of the invention for situations where it is known that an oil will be the lubricant, rather than water. This eliminates the need for various components and features that are preferably used in the embodiment of FIG. 1, to wit: outboard barrier seal 70, first groove wall 71, outboard sealed region 72, second groove wall 73, exit port 74, annular overflow groove 76, standpipe 78, and standpipe mouth 80.

When oil is used as the lubricant, it is often preferred that pressure-generating seal ring 44 be a solid cross-section as shown, in order to reduce the higher pumping rate that would otherwise occur owing to the viscosity of the oil. It is also preferred that wavy-edged hydrodynamic seal 34 be an energized seal (rather than a solid seal) that uses the hydrodynamic geometry of FIGS. 2A-2E, in order to minimize the pumping rate and seal-generated heat.

In FIG. 4, clamping element seal 18 has been illustrated as a gasket, and static seal 20 has been illustrated as an elastomeric rubber wear plate liner. Wavy-edged hydrodynamic seal 34 and pressure-generating seal ring 44 are illustrated in more detail than the schematic representations on FIG. 1, and their respective footprints with the shaft are illustrated as hidden lines. As shown, wavy-edged hydrodynamic seal 34 can have one or more anti-rotation projections 112 that engage the recess formed by lubricant port 32 for anti-rotation purposes, and to prevent the installation of wavy-edged hydrodynamic seal 34 into the groove provided for pressure-generating seal ring 44.

In regard to features in FIG. 4 that share like numbers with the features of FIG. 1, the features have the same function, and the general descriptions regarding FIG. 1 are also applicable to FIG. 4 and will not be repeated here to prevent unnecessary textual redundancy.

Description of FIG. 5

FIG. 5 is an embodiment of the invention for situations where it is known that water will be the lubricant, rather than oil, and illustrates an implementation in a Gould's brand pump. The following components that were used on FIG. 1 have been eliminated from the embodiment shown in FIG. 5; to wit:. retaining ring 54, instrument port 56, outboard pressure sensor 58, first groove wall 71, standpipe 78, standpipe mouth 80, rotating dust cover 82, dust cover seal 84, and set screws 85.

In FIG. 5, clamping element seal 18 and static seal 20 have been illustrated as gaskets. Wavy-edged hydrodynamic seal 34 and pressure-generating seal ring 44 are illustrated in more detail than the schematic representations on FIG. 1; note that they both preferably use energizers to reduce interfacial contact pressure, and both preferably use angled diverting features in order to lubricate properly with water as the lubricant. The housing 10 has been divided to have the additional separate components, housing 10B, and housing 10C, where housing 10 is typical of a standard stuffing box that comes with a pump. Throat ring 50 is retained by virtue of a press fit with housing 10, rather than by the retaining ring that was shown in FIG. 1. The rotary shaft is divided into two parts; rotary shaft 4A and rotary shaft 4B, where rotary shaft 4B is a sleeve that mounts on rotary shaft 4A. The one or more outboard barrier seals 70 are illustrated as conventional spring-energized cantilever lip seals. To illustrate the variations that are possible, the left hand version of the one or more cantilever lip seals 22 has an energizer element 29 that is a cantilever spring, and has a soft resilient filler material 25, and the right hand version of the one or more cantilever lip seals 22 is shown with an energizer element 29 that is a soft elastomer. A sleeve seal 128 is provided to seal rotary shaft 4B to impeller 8. A box seal 132, schematically represented, is provided to seal between housing 10 and housing 10B. Without departing from the spirit or scope of the invention, box seal 132 can be any suitable type of sealing arrangement, such as gasket material, O-rings, square rings, spring-energized lip seals, etc.

If desired, the existing flush port 130 of a typical pump housing 10 can be used to cool rotary shaft sealing assembly 2. The large area of flange 16 that is exposed to first fluid 6 also provides efficient cooling of rotary shaft sealing assembly 2.

In regard to features in FIG. 5 that share like numbers with the features of FIG. 1, the features have the same function, and the general descriptions regarding FIG. 1 are also applicable to FIG. 5 and will not be repeated here to prevent unnecessary textual redundancy.

Description of FIG. 6

FIG. 6 is another embodiment of the invention. The following components that were used on FIG. 1 have been eliminated from the simplified embodiment of the invention shown in FIG. 6; to wit: pressure-generating seal ring 44, retaining ring 54, instrument port 56, outboard pressure sensor 58, outboard barrier seal 70, first groove wall 71, outboard sealed region 72, second groove wall 73, exit port 74, annular overflow groove 76, standpipe 78, standpipe mouth 80, rotating dust cover 82, dust cover seal 84, set screws 85, weir 86, projecting length 90, and drainage groove 92. It is understood that wavy-edged hydrodynamic seal 34 illustrated schematically in FIG. 6 can be any of the hydrodynamic seals discussed in conjunction with FIGS. 2A-2E, 3A, 3C, 3D or 3F, and it is understood that although housing 10 is shown as a one piece component, it can comprise one or more pieces.

In FIG. 6, since pressure-generating seal ring 44 has been eliminated, the assembly relies solely on the lubricant pressure from lubricant supply 11 to lubricate and flush the one or more cantilever lip seals 22; flow control 62 is used to control the flow of lubricant past the one or more cantilever lip seals 22. This prior art flushing arrangement with its known limitations (such as susceptibility to orifice clogging of flow control 62), gives up an important advantage of the assembly shown in FIG. 1 in that the pressure-generating seal ring 44 is not present to regulate the flow of lubricant past the one or more cantilever lip seals 22. It still has a major advantage over the prior art, however, in that wavy-edged hydrodynamic seal 34 is well suited to contain the pressure from lubricant supply 11, unlike the conventional lip seals of the prior art, and therefore the assembly of FIG. 6 will significantly outlast prior art sealing arrangements such as typical cement pump sealing arrangements, and represents a huge economic benefit over the prior art. Also, throat ring 50 is illustrated as being threadedly retained, to illustrate the variations that are possible.

In regard to features in FIG. 6 that share like numbers with the features of FIG. 1, the features have the same function, and the general descriptions regarding FIG. 1 are also applicable to FIG. 6 and will not be repeated here to prevent unnecessary textual redundancy.

Description of FIG. 7

FIG. 7 is another embodiment of the invention that is similar in arrangement to FIG. 6, but instead of a custom seal housing, it can utilize the stock stuffing box arrangement that typically comes with a pump. The housing of FIG. 7 is comprised of stock housing components 10, 10D and 10F and replacement housing component 10E. Housing component 10D is often called a lantern ring. Housing component 10F is often called a gland nut. Housing component 10E is often called a packing follower. Although It is understood that wavy-edged hydrodynamic seal 34 can be any of the hydrodynamic seals discussed in conjunction with FIGS. 2A-2E, 3A or 3C, FIG. 7 shows that the packing follower can incorporate first supporting wall 37, which can if desired include an angulated surface 110 for supporting the type of wavy-edged hydrodynamic seal 34 that is shown in FIGS. 2A-2C. In regard to all other features in FIG. 7 that share like numbers with the features of FIG. 1, the features have the same function, and the descriptions regarding FIG. 1 are also applicable to FIG. 7 and will not be repeated here to prevent unnecessary textual redundancy.

The following components that were used on FIG. 1 have been eliminated from the simplified embodiment of the invention shown in FIG. 7; to wit: first groove wall 42, second groove wall 43, pressure-generating seal ring 44, instrument port 56, outboard pressure sensor 58, outboard barrier seal 70, first groove wall 71, outboard sealed region 72, second groove wall 73, exit port 74, annular overflow groove 76, standpipe 78, standpipe mouth 80, rotating dust cover 82, dust cover seal 84, set screws 85, weir 86, projecting length 90, and drainage groove 92.

As with FIG. 6, in FIG. 7 since pressure-generating seal ring 44 has been eliminated, the assembly relies solely on the lubricant pressure from lubricant supply 11 to lubricate and flush the one or more cantilever lip seals 22; flow control 62 is used to control the flow of lubricant past the one or more cantilever lip seals 22. This gives up an important advantage of the assembly shown in FIG. 1 in that the pressure-generating seal ring 44 is not present to regulate the flow of lubricant past the one or more cantilever lip seals 22. It still has a major advantage over the prior art, however, in that wavy-edged hydrodynamic seal 34 is well suited to contain the pressure from lubricant supply 11 during rotary operation, unlike the conventional lip seals of the prior art, and therefore the assembly of FIG. 7 will significantly outlast prior art cement pump sealing arrangements, such as prior art cement pump sealing arrangements.

Description of FIG. 8

FIG. 8 is yet another embodiment of the invention that is quite similar to FIG. 4, however instead of using a custom housing, the arrangement of FIG. 8 utilizes the stock stuffing that typically comes with a pump. The seal carrier of FIG. 8 is comprised of stock housing components 10, 10D and 10F and replacement housing component 10E. Housing component 10D is often called a lantern ring. Housing component 10F is often called a gland nut. Housing component 10E is often called a packing follower. Although it is understood that wavy-edged hydrodynamic seal 34 can be any of the hydrodynamic seals discussed in conjunction with FIGS. 2A-2E, 3A, 3C, 3D or 3F, FIG. 7 shows that the packing follower can incorporate first supporting wall 37, which can if desired include an angulated surface 110 for supporting the type of wavy-edged hydrodynamic seal 34 that is shown in FIGS. 2A-2C.

Weir 86 (which has the same function as the like-numbered geometry in FIG. 1) is formed from the housing component 10F (e.g. gland nut), and is preferably telescoped inside of rotating dust cover 82. Drainage groove 92 (which has the same function as the like-numbered geometry in FIG. 1) is formed by the space between housing component 10F (e.g. the gland nut) and housing component 10 (e.g. the standard stuffing box).

In regard to features in FIG. 8 that share like numbers with the features of FIG. 1, the features have the same function, and the general descriptions regarding FIG. 1 are also applicable to FIG. 8 and will not be repeated here to prevent unnecessary textual redundancy.

The following components that were used on FIG. 1 have been eliminated from the simplified embodiment of the invention shown in FIG. 8; to wit: instrument port 56, outboard pressure sensor 58, outboard barrier seal 70, first groove wall 71, outboard sealed region 72, second groove wall 73, exit port 74, annular overflow groove 76, standpipe 78, and standpipe mouth 80.

Figure 9:
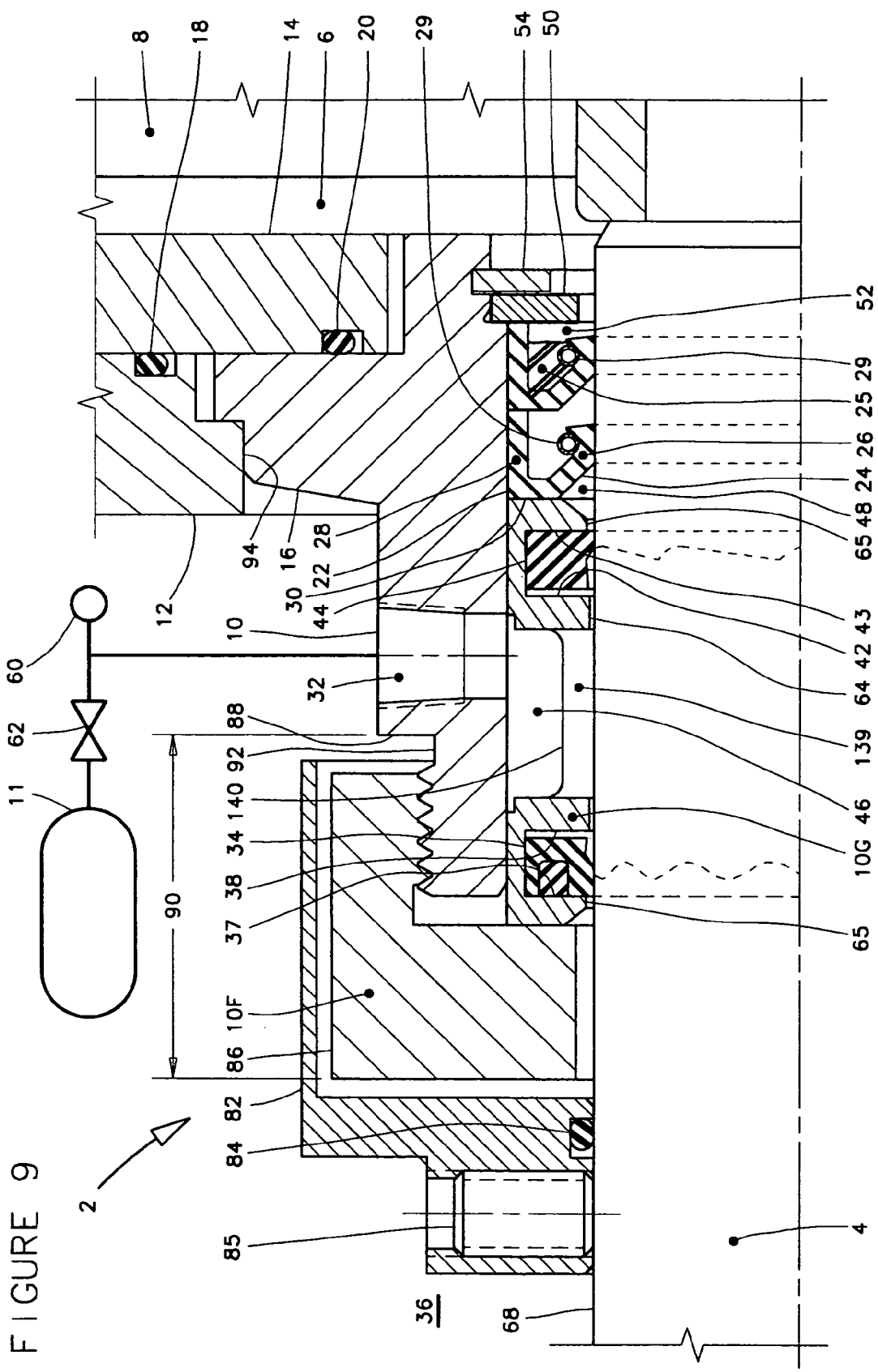
FIG. 9 is a fragmentary elevation view, in cross-section, of a rotary seal assembly according to another embodiment of the present invention, the embodiment including one or more cantilever lip seals, a pressure-generating seal ring, and a wavy-edged hydrodynamic seal in sealing engagement with a rotary shaft and a housing.

Description of FIG. 9

FIG. 9 is another embodiment of the invention that is quite similar to FIG. 8, but the wavy-edged hydrodynamic seal 34 and pressure-generating seal ring 44 are held within a housing component 10G that is a seal carrier having skeletonized construction by virtue of cutouts 139, to facilitate filling lubricant-filled region 46. The seal carrier of FIG. 9 is comprised of stock seal carrier components 10, 10F and 10G.

In regard to features in FIG. 9 that share like numbers with the features of FIG. 1, the features have the same function, and the general descriptions regarding FIG. 1 are also applicable to FIG. 9 and will not be repeated here to prevent unnecessary textual redundancy.

The following components that were used on FIG. 1 have been eliminated from the simplified embodiment of the invention shown in FIG. 9; to wit: instrument port 56, outboard pressure sensor 58, lubricant groove 66, outboard barrier seal 70, first groove wall 71, outboard sealed region 72, second groove wall 73, exit port 74, annular overflow groove 76, standpipe 78, and standpipe mouth 80.

CONCLUSION

Although the several embodiments of the present invention are described and illustrated herein particularly as they relate to centrifugal pumps, it should be born in mind that such is not intended to limit the spirit and scope of the invention, for the invention will find a wide variety of uses in circumstances where rotary shafts are employed to penetrate a vessel boundary, particularly when the vessel confines a fluid which may include abrasive particulate matter.

In view of the foregoing it is evident that the present invention is one well adapted to attain all of the objects and features hereinabove set forth, together with other objects and features which are inherent in the apparatus disclosed herein.

As will be readily apparent to those skilled in the art, the present invention may easily be produced in other specific forms without departing from its spirit or essential characteristics. The present embodiments are, therefore, to be considered as merely illustrative and not restrictive, the scope of the invention being indicated by the claims rather than the foregoing description, and all changes which come within the meaning and range of equivalence of the claims are therefore intended to be embraced therein.

We claim:

1. A rotary shaft sealing assembly for partitioning a first fluid from a second fluid, the rotary shaft sealing assembly comprising:

a housing assembly having a first supporting wall and a second supporting wall, said second supporting wall having a recess;

a rotary shaft located at least partially within said housing assembly and having at least one relative rotation direction;

a weir formed in said housing assembly and circumscribing a passageway through which said rotary shaft extends;

a dust cover mounted on said rotary shaft, said dust cover including a cover portion extending over at least a portion of said weir;

a cantilever lip seal in sealing engagement with said housing assembly and said rotary shaft, said cantilever lip seal having a first energizer element and a cantilevered lip facing the first fluid;

a pressure-generating seal ring in sealing engagement with said housing assembly and said rotary shaft and having a first hydrodynamic lip defining a first dynamic surface, said pressure-generating seal ring having at least one hydrodynamic inlet and at least one angled diverting feature providing flushing and lubricating of said cantilevered lip of said cantilever lip seal in response to relative rotation of said rotary shaft, wherein said pressure-generating seal ring and said cantilever lip seal define at least a portion of a sealed region having a pressure;

a wavy-edged hydrodynamic seal located intermediate said first and second supporting walls and in sealing engagement with said housing assembly and said rotary shaft, said wavy-edged hydrodynamic seal comprising a second hydrodynamic lip of cantilevered construction having a predetermined modulus of elasticity and defining a second dynamic surface, said second hydrodynamic lip defining a circular edge generally facing said first supporting wall and at least one hydrodynamic inlet of skewed configuration for facing a lubricant-filled region, said hydrodynamic inlet being skewed in relation to said circular edge and generally facing said second supporting wall, said second hydrodynamic lip having a wavy edge that defines at least one wave having a leading wave edge and a trailing wave edge, said wavy-edged hydrodynamic seal having an anti-rotation projection engaging said recess in said second supporting wall and also having a seal recess generally facing said lubricant-filled region;

wherein said wavy-edged hydrodynamic seal and said pressure-generating seal ring define at least a portion of said lubricant-filled region having a pressure, and circulation through said lubricant-filled region cools said housing assembly;

a lubricant supply providing a pressurized lubricant to said lubricant-filled region;

a flow control regulating the flow of said lubricant;

an inboard pressure sensor monitoring said pressure of said lubricant-filled region;

at least one bearing within said housing assembly and in said lubricant-filled region;

an outboard barrier seal in sealing engagement with said rotary shaft and said housing assembly, said wavy-edged hydrodynamic seal and said outboard barrier seal defining at least part of an outboard sealed region; and an exit port in said housing assembly for draining said outboard sealed region.

2. A rotary shaft sealing assembly for partitioning a first fluid from a second fluid, the rotary shaft sealing assembly comprising:

a housing assembly;

a rotary shaft located at least partially within said housing assembly and having at least one relative rotation direction, a cantilever lip seal in sealing engagement with said rotary shaft and said housing assembly, said cantilever lip seal having a cantilevered lip for facing the first fluid; and a pressure-generating seal ring in sealing engagement with said rotary shaft and said housing assembly, said pressure-generating seal ring having a hydrodynamic lip defining a dynamic surface, said pressure-generating seal ring having at least one hydrodynamic inlet and at least one angled diverting feature providing flushing and lubricating of said cantilevered lip of said cantilever lip seal with a lubricant in response to relative rotation of said rotary shaft.

3. The rotary shaft sealing assembly of claim 2, wherein:
said at least one hydrodynamic inlet of said pressure-generating seal ring includes a plurality of hydrodynamic inlets; and
said at least one angled diverting feature includes a plurality of angled diverting features.

4. The rotary shaft sealing assembly of claim 2, wherein said pressure-generating seal ring defines a circular edge.

5. The rotary shaft sealing assembly of claim 2, wherein said at least one angled diverting feature of said pressure-generating seal ring comprises a projection or depression.

6. The rotary shaft sealing assembly of claim 2, wherein:
said hydrodynamic lip defines a wavy edge providing at least one wave having a leading wave edge and a trailing wave edge;
said at least one hydrodynamic inlet defining at least a portion of said leading wave edge; and
said at least one angled diverting feature being more abrupt than said at least one hydrodynamic inlet, and defining at least a portion of said trailing wave edge.

7. The rotary shaft sealing assembly of claim 2, wherein:
said pressure-generating seal ring and said cantilever lip seal define at least a portion of a sealed region having a pressure; and
an outboard pressure sensor monitors said pressure of said sealed region.

8. The rotary shaft sealing assembly of claim 2, wherein said cantilever lip seal is provided with a resilient filler material.

9. The rotary shaft sealing assembly of claim 2, wherein said housing assembly and said rotary shaft are substantially aligned with each other by said pressure-generating seal ring and said cantilever lip seal.

10. The rotary shaft sealing assembly of claim 2, wherein said housing assembly is comprised of a plurality of housing components.

11. The rotary shaft sealing assembly of claim 2, further comprising:
a wavy-edged hydrodynamic seal in sealing engagement with said rotary shaft and said housing assembly, said wavy-edged hydrodynamic seal having a hydrodynamic inlet of skewed configuration being defined by a hydrodynamic lip with a predetermined modulus of elasticity;
said wavy-edged hydrodynamic seal and said pressure-generating seal ring defining at least a portion of a lubricant-filled region having a pressure; and
said hydrodynamic inlet of said wavy-edged hydrodynamic seal and said pressure-generating seal ring each facing said lubricant-filled region.

12. The rotary shaft sealing assembly of claim 11, further comprising an inboard pressure sensor monitoring said pressure of said lubricant-filled region.

13. The rotary shaft sealing assembly of claim 11, further comprising a lubricant supply providing a lubricant to said lubricant-filled region.

14. The rotary shaft sealing assembly of claim 11, further comprising a lubricant supply providing a pressurized lubricant to said lubricant-filled region.

15. The rotary shaft sealing assembly of claim 14, further comprising a flow control regulating the flow of lubricant past said cantilever lip seal in the event of failure of said pressure-generating seal ring.

16. The rotary shaft sealing assembly of claim 11, further comprising at least one bearing within said lubricant-filled region in said housing assembly and around said rotary shaft.

17. The rotary shaft sealing assembly of claim 11, further comprising:
said housing defining a weir and a passage for said rotary shaft therethrough; and
a dust cover rotationally mounted on said rotary shaft, and at least a portion of said dust cover telescoping over at least a portion of said weir.

18. The rotary shaft sealing assembly of claim 11, wherein said wavy-edged hydrodynamic seal includes an energizer element having a modulus of elasticity different than said predetermined modulus of elasticity of said hydrodynamic lip.

19. The rotary shaft sealing assembly of claim 18, wherein said energizer element is a spring.

20. The rotary shaft sealing assembly of claim 18, wherein said energizer element of said wavy-edged hydrodynamic seal comprises an elastomer having a modulus of elasticity that is less than said predetermined modulus of elasticity of said hydrodynamic lip of said wavy-edged hydrodynamic seal.

21. The rotary shaft sealing assembly of claim 11, wherein said wavy-edged hydrodynamic seal defines at least one angled diverting feature.

22. The rotary shaft sealing assembly of claim 21, wherein said angled diverting feature is selected from a group comprising, skewed ridges, skewed depressions, abrupt trailing edge, and combined inlet and trailing edge.

23. The rotary shaft sealing assembly of claim 11, further comprising:
an outboard barrier seal in sealing engagement with said rotary shaft and said housing assembly, said wavy-edged hydrodynamic seal and said outboard barrier seal defining at least part of an outboard sealed region; and
an exit port in said housing assembly for draining said outboard sealed region.

24. A rotary shaft sealing assembly for partitioning a first fluid from a second fluid, the rotary shaft sealing assembly comprising:
a housing assembly;
a rotary shaft located at least partially within said housing assembly and having at least one relative rotation direction;
a cantilever lip seal in sealing engagement with said rotary shaft and said housing assembly, said cantilever lip seal having a recess facing the first fluid and defining a cantilevered lip;
a wavy-edged hydrodynamic seal in sealing engagement with said rotary shaft and said housing assembly, said hydrodynamic seal having at least one hydrodynamic inlet of skewed configuration being defined by a hydrodynamic lip having a predetermined modulus of elasticity;
a lubricant supply providing a lubricant at a pressure higher than the pressure of the first fluid to a region within said housing assembly between said cantilever lip seal and said hydrodynamic seal; and
a flow control regulating the flow of said lubricant past said cantilever lip and into the first fluid.

25. The rotary shaft sealing assembly of claim 24, wherein said at least one hydrodynamic lip having a circular edge.

26. The rotary shaft sealing assembly of claim 24, wherein said cantilever lip seal includes a resilient filler material facing the first fluid.

27. The rotary shaft sealing assembly of claim 24, further comprising an inboard pressure sensor monitoring said pressure of said lubricant.

28. The rotary shaft sealing assembly of claim 24, wherein said hydrodynamic seal includes an energizer element having a modulus of elasticity different than said predetermined modulus of elasticity of said hydrodynamic lip.

29. The rotary shaft sealing assembly of claim 28, wherein said energizer element of said hydrodynamic seal is a spring.

30. The rotary shaft sealing assembly of claim 28, wherein said energizer element of said hydrodynamic seal comprises an elastomer having a modulus of elasticity less than said predetermined modulus of elasticity of said hydrodynamic lip.

31. The rotary shaft sealing assembly of claim 24, wherein said wavy-edged hydrodynamic seal includes at least one angled diverting feature.

32. The rotary shaft sealing assembly of claim 24, further comprising a first supporting wall defining a sloped support surface for supporting said hydrodynamic lip of said wavy-edged hydrodynamic seal.

33. The rotary shaft sealing assembly of claim 24, wherein said wavy-edged hydrodynamic seal includes at least one anti-rotation projection engaging at least one recess within said housing assembly.

34. The rotary shaft sealing assembly of claim 24, wherein circulation is used to cool said housing assembly.

35. The rotary shaft sealing assembly of claim 24, further comprising a bearing provided within said housing assembly and around said rotary shaft.

* * * * *